United States Patent [19]
Noda

[11] Patent Number: 5,675,523
[45] Date of Patent: Oct. 7, 1997

[54] WAVEFORM DATA GENERATING APPARATUS

[75] Inventor: Hiroshi Noda, Hyogo, Japan

[73] Assignee: Mitsubishi Denki Kabushiki Kaisha, Tokyo, Japan

[21] Appl. No.: 453,119

[22] Filed: May 30, 1995

[30] Foreign Application Priority Data

Jun. 1, 1994 [JP] Japan .................... 6-119964

[51] Int. Cl.$^6$ .................................... G06J 1/00
[52] U.S. Cl. ............................................ 364/607
[58] Field of Search ................. 364/721, 724.01, 364/607

[56] References Cited

U.S. PATENT DOCUMENTS 5,495,202 2/1996 Hsu .......................... 364/607

*Primary Examiner*—Tan V. Mai
*Attorney, Agent, or Firm*—Lowe, Price, LeBlanc & Becker

[57] ABSTRACT

By using only a template of a step response waveform when the waveform changes from "0" level to "1" level, a filter coefficient representing nature of voltage noises, such as reflection and rounding, in terms of polynomial of exponential function is generated by a filter coefficient generator. Respective logic data from a test pattern generator are divided by a filter order, and thus divided logic data are produced. The filter order corresponding to a number of taps. By operating the filter coefficient and the divided logic data by a filter arithmetic unit, data of an analog waveform is generated. The data of the analog waveform is skipped by a data skipping apparatus, the result is applied to an analog waveform generating apparatus, and an analog waveform is generated.

11 Claims, 22 Drawing Sheets

FIG.9

| ADDRESS | 0 | 1 | 2 | 3 | ... | n | ... | M |
|---|---|---|---|---|---|---|---|---|
| (1) INPUT OF POINT OF CHANGE | | $t_1$ | $t_2$ | $t_3$ | | $t_n$ | | $t_M$ |
| (2) INPUT OF INCLINATION | $t_{r0}$ | $t_{r1}$ | $t_{r2}$ | $t_{r3}$ | | $t_{rn}$ | | $t_{rM}$ |
| (3) INPUT OF AMPLITUDE | $a_0$ | $a_1$ | $a_2$ | $a_3$ | | $a_n$ | | $a_M$ |
| (4) INPUT OF BIT RATE PERIOD | $t_{max}$ | | | | | | | |
| (5) INPUT OF FILTER ORDER (INPUT OF NUMBER OF TAPS) | $j_{max}$ | | | | | | | |
| (6) DIVIDE $t_n$ BY $t_{max}$ | | $P_1$ | $P_2$ | $P_3$ | | $P_n$ | | $P_M$ |
| (7) DIVIDE $t_{rn}$ BY $t_{max}$ | $P_{r0}$ | $P_{r1}$ | $P_{r2}$ | $P_{r3}$ | | $P_{rn}$ | | $P_{rM}$ |
| (8) MULTIPLY $P_n$ BY $j_{max}$ | $j_0=1$ | $j_1$ | $j_2$ | $j_3$ | | $j_n$ | | $j_M$ |
| (9) MULTIPLY $P_{rn}$ BY $j_{max}$ | $b_{r0}$ | $b_{r1}$ | $b_{r2}$ | $b_{r3}$ | | $b_{rn}$ | | $b_{rM}$ |
| (10) CALCULATE RECIPROCAL NUMBER OF $b_{rn}$ | $b_0$ | $b_1$ | $b_2$ | $b_3$ | | $b_n$ | | $b_M$ |

FIG.10

| ADDRESS | 0 | 1 | 2 | 3 | ... | $j_1-2$ | $j_1-1$ | $j_1$ | $j_1+1$ | ... | $j_2-1$ | $j_2$ | ... | $j_n-2$ | $j_n-1$ | $j_n$ | $j_n+1$ | ... | $j_M-1$ | $j_M$ | ... | $j_{max}-2$ | $j_{max}-1$ | $j_{max}$ | (12) THE SUM TOTAL | (13) $f_{nj}$ |
|---|---|---|---|---|---|---|---|---|---|---|---|---|---|---|---|---|---|---|---|---|---|---|---|---|---|---|
| FILTER ORDER j (TAP NUMBER) | 1 | 2 | 3 | 4 | ... | $j_1-1$ | $j_1$ | $j_1+1$ | ... | ... | $j_2$ | ... | ... | $j_n-1$ | $j_n$ | $j_n+1$ | ... | ... | $j_M$ | ... | ... | $j_{max}-1$ | $j_{max}$ | | |
| $U_{0j}$ | $U_{01}$ | $U_{02}$ | $U_{03}$ | $U_{04}$ | ... | $U_{0(j_1-1)}$ | $U_{0j_1}$ | $U_{0(j_1+1)}$ | ... | ... | $U_{0j_2}$ | ... | ... | $U_{0(j_n-1)}$ | $U_{0j_n}$ | $U_{0(j_n+1)}$ | ... | ... | $U_{0j_M}$ | ... | ... | $U_{0(j_{max}-1)}$ | $U_{0j_{max}}$ | $S_0$ | $f_{0j}$ |
| $U_{1j}$ | 0 | 0 | 0 | 0 | ... | 0 | $U_{1j_1}$ | $U_{1(j_1+1)}$ | ... | ... | $U_{1j_2}$ | ... | ... | $U_{1(j_n-1)}$ | $U_{1j_n}$ | $U_{1(j_n+1)}$ | ... | ... | $U_{1j_M}$ | ... | ... | $U_{1(j_{max}-1)}$ | $U_{1j_{max}}$ | $S_1$ | $f_{1j}$ |
| $U_{2j}$ | 0 | 0 | 0 | 0 | ... | 0 | 0 | 0 | ... | ... | $U_{2j_2}$ | ... | ... | $U_{2(j_n-1)}$ | $U_{2j_n}$ | $U_{2(j_n+1)}$ | ... | ... | $U_{2j_M}$ | ... | ... | $U_{2(j_{max}-1)}$ | $U_{2j_{max}}$ | $S_2$ | $f_{2j}$ |
| ... | ... | ... | ... | ... | ... | ... | ... | ... | ... | ... | ... | ... | ... | ... | ... | ... | ... | ... | ... | ... | ... | ... | ... | ... | ... |
| $U_{nj}$ | 0 | 0 | 0 | 0 | ... | 0 | 0 | 0 | ... | ... | 0 | ... | ... | 0 | $U_{nj_n}$ | $U_{n(j_n+1)}$ | ... | ... | $U_{nj_M}$ | ... | ... | $U_{n(j_{max}-1)}$ | $U_{nj_{max}}$ | $S_n$ | $f_{nj}$ |
| ... | ... | ... | ... | ... | ... | ... | ... | ... | ... | ... | ... | ... | ... | ... | ... | ... | ... | ... | ... | ... | ... | ... | ... | ... | ... |
| $U_{Mj}$ | 0 | 0 | 0 | 0 | ... | 0 | 0 | 0 | ... | ... | 0 | ... | ... | 0 | 0 | 0 | ... | ... | $U_{Mj_M}$ | ... | ... | $U_{M(j_{max}-1)}$ | $U_{Mj_{max}}$ | $S_M$ | $f_{Mj}$ |

(11) — NUMBER OF TAPS: $j_{max}$

| TIME | 0 | Δt | ΔtX2 | ΔtX3 | ... | ΔtXm | ... | ΔtX(jmax-1) | ΔtXjmax |
|---|---|---|---|---|---|---|---|---|---|
| ADDRESS | 0 | 1 | 2 | 3 | ... | m | ... | jmax-1 | jmax |
| (1) VOLTAGE Vm | V0 | V1 | V2 | V3 | ... | Vm | ... | V(jmax-1) | Vjmax |
| (2) NORMALIZED Dm | D0 | D1 | D2 | D3 | ... | Dm | ... | D(jmax-1) | Djmax |

| ADDRESS | 0 | 1 | 2 | ... | j-1 | ... | jmax-2 | jmax-1 |
|---|---|---|---|---|---|---|---|---|
| FILTER ORDER j (TAP NUMBER) | 1 | 2 | 3 | ... | j | ... | jmax-1 | jmax |
| (3) FILTER COEFFICIENT fcj | fc1 | fc2 | fc3 | ... | fcj | ... | fc(jmax-1) | fcjmax |

NUMBER OF TAPS: jmax

FIG.22 PRIOR ART

| | S1 | S2 | S3 | S4 | S5 | S6 | S7 | S8 | S9 | S10 | S11 | ... |
|---|---|---|---|---|---|---|---|---|---|---|---|---|
| (1) STATE | | | | | | | | | | | | |
| (2) LOGIC DATA | 0 | 1 | 0 | -1 | 0 | 1 | -1 | 0 | 0 | -1 | 1 | ... |
| (3) PHYSICAL SYMBOL (IDEAL DIGITAL WAVEFORM) | | | | | | | | | | | | ... |
| (4) TEMPLATE # | | #2 | #4 | #3 | #7 | #2 | #6 | #7 | #1 | #3 | #8 | ... |
| (5) ANALOG WAVEFORM OBTAINED BY ADDING NOISE TO DIGITAL WAVEFORM | | | | | | | | | | | | ... |

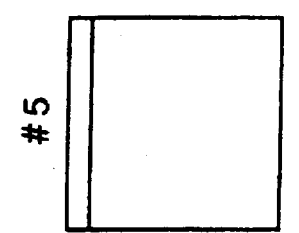
FIG.23(e) PRIOR ART #5  1→1
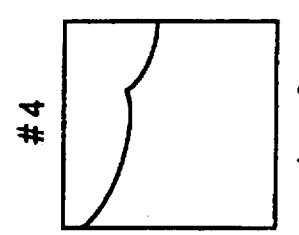
FIG.23(d) PRIOR ART #4  1→0
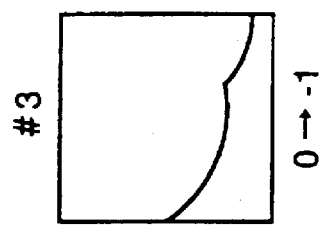
FIG.23(c) PRIOR ART #3  0→-1
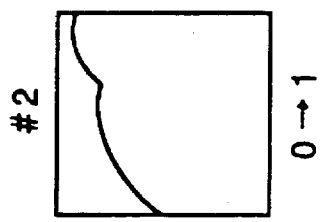
FIG.23(b) PRIOR ART #2  0→1
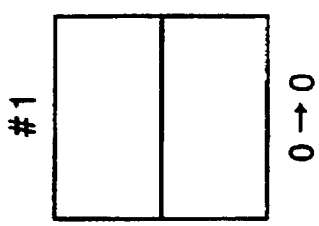
FIG.23(a) PRIOR ART #1  0→0
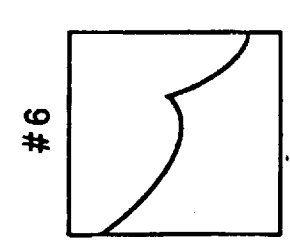
FIG.23(i) PRIOR ART #9  -1→-1
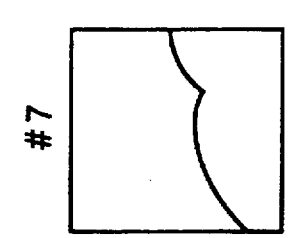
FIG.23(h) PRIOR ART #8  -1→1
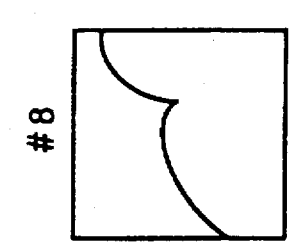
FIG.23(g) PRIOR ART #7  -1→0
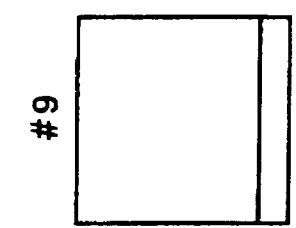
FIG.23(f) PRIOR ART #6  1→-1

WAVEFORM DATA GENERATING APPARATUS

BACKGROUND OF THE INVENTION

1. Field of the Invention

The present invention relates to a waveform data generating apparatus. More specifically, the present invention relates to a waveform data generating apparatus for generating data necessary for generating an analog waveform obtained by adding voltage noises such as reflection and rounding to a digital waveform.

2. Description of the Background Art

A standard for communication apparatuses formed by semiconductor devices and the like has been determined as ITU-T Recommendation by ITU-TS (International Telecommunication Union-Telecommunication Standardization Sector), which is one of expert committees of the United Nations. According to this standard, it becomes necessary to test and evaluate an analog waveform including noises such as reflection or rounding added to a digital waveform, which is the data for communication. Therefore, development of an apparatus and a method for generating an arbitrary waveform enabling generation of such analog waveform is strongly desired.

FIG. 19 shows a structure for testing a communication apparatus including semiconductor devices in accordance with ITU-T Recommendation I.430. Referring to FIG. 19, an analog waveform including noises such as reflection and rounding in accordance with the ITU-T Recommendation output from an arbitrary waveform generating apparatus 60 is input through an input side pulse transformer 61 to a communication apparatus 62 including semiconductor devices. The analog waveform output from communication apparatus 62 is input through an output side pulse transformer 63 and a terminal resistor 64 to a measuring apparatus 66, and compared with a pulse mask (expected value) defined in ITU-T Recommendation (which is referred to as a pulse mask test). Another digital waveform output from communication apparatus 62 is input to measuring apparatus 66 through a plurality of digital signal lines 65, and a test to see whether there is a whisker in the waveform (noise tolerance test) or a test to determine how much the waveform is deviated from the expected value (timing error test) is performed.

FIG. 20 shows an example of an analog waveform including noises such as reflection and rounding in accordance with I.430 of ITU-T Recommendation. FIG. 21 is a block diagram showing a structure of an arbitrary waveform generating apparatus for generating an analog waveform by adding reflection and rounding to a conventional digital waveform.

Referring to FIG. 21, a list of voltages are input from an input terminal 31 and applied to an arithmetic unit 32. A test pattern is applied from a test pattern generator 7 to arithmetic unit 32. Arithmetic unit 32 rearranges the list of voltages in accordance with the change in a logic data applied from test pattern generator 7, and a test computer, for example, is used as this unit. An output from arithmetic unit 32 is applied to an analog waveform generating apparatus 11. Analog waveform generating apparatus 11 includes a waveform memory 12 for storing data output from arithmetic unit 32; a digital-to-analog (D/A) converter 13 for converting the waveform data read from waveform memory 12 to an analog signal; and a waveform memory address control circuit 14 for controlling addresses of waveform memory 12.

FIG. 22 shows an arrangement of data operated in the arithmetic unit shown in FIG. 21. In FIG. 22, the row (1) represents state, the row (2) shows examples of logic data output from test pattern generator 7, (3) represents logic data of (2) in terms of physical symbol, in which the abscissa represents time and the ordinate represents voltage. The physical symbol of (3) of FIG. 22 corresponds to the ideal digital waveform.

FIG. 23 shows an example of templates of waveforms necessary as input to ISDN S interface LSI. The template is defined by ITU-T Recommendation I.430 in which the abscissa represents time or time normalized by 1 bit rate, and the ordinate represents voltage or voltage normalized by the maximum voltage of an ideal digital waveform. Templates #1 to #9 are response waveforms corresponding to the change in the ideal digital waveform. When there are logic data "1", "0" and "−1", nine different templates are necessary. #1 is a template corresponding to the change of the data from "0" to "0"; #2 is a template corresponding to the change of data from "0" to "1"; and #3 is a template corresponding to the change of data from "0" to "−1". #4 is a template corresponding to the change of data from "1" to "0"; #5 is a template corresponding to the change of data from "1" to "1"; #6 is a template corresponding to the change of data from "1" to "−1"; #7 is a template corresponding to the change of data from "−1" to "0"; #8 is a template corresponding to the change of data from "−1" to "1", and #9 is a template corresponding to the change of data from "−1" to "−1".

Returning to FIG. 22, the row (4) represents a series of templates corresponding to the changes in the ideal digital waveform. Referring to FIG. 22, when the state changes from state s1 to state s2, template #2 is applied; when the state changes from state s2 to state s3, template #4 is applied; when the state changes from state s3 to state s4, template #3 is applied; when the state changes from state s4 to s5, #7 is applied; and when the state changes from state s5 to state s6, #2 is applied. Further, when the state changes from state s6 to state s7, #6 is applied; and when the state changes from state s7 to state s8, #7 is applied. When the state changes from s8 to s9, #1 is applied; when the state changes from s9 to s10, #3 is applied; and when the state changes from s10 to s11, #8 is applied.

The row (5) of FIG. 22 shows an arrangement of these templates in order, which correspond to an analog waveform including noises such as reflection and rounding added to the digital waveform necessary for the input of LSI.

FIG. 24 is a flow chart showing the process for generating data of the list of voltages manually input to an input terminal 31 of FIG. 21. Referring to FIG. 24, a waveform accuracy determining means 33 determines resolution of an output waveform, and the determined resolution is applied to a voltage list generating means 34. Voltage list generating means 34 includes sampling means 35 and voltage value reading means 36. The list of voltages is produced manually by using the templates of waveform shown in FIG. 23 defined by ITU-T Recommendation, from voltage value reading means 36.

The operation will be described. Referring to FIG. 24, time resolution per data is determined by waveform accuracy determining means 33. The value j of resolution is largest positive integer satisfying $j < f_s/f_d$, where $f_s$ represents sampling frequency of analog waveform generating apparatus 11 and $f_d$ represents frequency of the data.

In voltage list generating means 34, sampling means 35 divides time axis of respective ones of the templates shown in FIG. 23 with the resolution j, voltage value reading means 36 reads respective voltages of the samples obtained by the sampling means and provides a list of voltages.

FIG. 25 shows the manner of generation of the list of voltages, referring to the template of #4 of FIG. 23 as an example. FIG. 25(a) shows an example in which time axis of the template is divided by the resolution j=12, and FIG. 25(b) shows a list of voltages obtained by listing the templates as 12 data. For example, when j=1, the voltage of the template is $V_1$, and the value $V_1$ is set as corresponding to element number 1. Similar operation is repeated for j=2 to j=12. In this manner, list of voltages corresponding to nine different templates are prepared by voltage list generating means 34. Nine different lists of voltages generated by the above described method are input to input terminal 31 of FIG. 21.

Arithmetic unit 32 shown in FIG. 21 arranges the list of voltages of the templates corresponding to the change in logic data output from test pattern generator 7. FIG. 22 shows an example of the arrangement in which FIG. 22(4) represents a template number of FIG. 23 corresponding to the change in the logic data of FIG. 22(2). For example, when the state changes from s1 to s2, logic data changes from "0" to "1", and voltage list of template #2 of FIG. 23 which corresponds to this change is extracted. Similar operation is performed for the change of state from s2 to s3 et seq. By connecting the list of voltages of nine different templates extracted in this manner, data for generating continuous analog waveform are produced, which data are quantized (represented in binary notation).

In analog waveform generating apparatus 11, the data of the quantized list of voltages is loaded to waveform memory 12, address of the waveform memory 12 is designated by waveform memory address control circuit 14, and an analog waveform defined by the template having reflection, rounding or the like is output from D/A converter through analog waveform output terminal 15.

The conventional arbitrary waveform generating apparatus is structured as described above, and therefore by the conventional method and apparatus for generating arbitrary waveform for generating an analog waveform including voltage noises such as reflection and rounding, it is necessary to generate, in non-automatic manner, a large number of lists of voltages corresponding to different templates for one waveform. This required considerable time.

SUMMARY OF THE INVENTION

Therefore, an object of the present invention is to provide a waveform data generating apparatus capable of generating data of an analog waveform including voltage noises to be loaded in a waveform memory of an analog waveform generating apparatus, by using only one type of template for one type of waveform.

Briefly stated, in the present invention, a filter coefficient representing nature of voltage noises such as reflection and rounding, given in terms of a polynomial of exponential function is generated by using elements obtained by dividing a step response waveform; a divided logic data obtained by dividing various logic data for testing by a filter order is generated, the filter order means the number of taps; data of an analog waveform is generated by the operation of the filter coefficient and the divided logic data; and the data of the analog waveform is skipped.

Therefore, according to the present invention, an analog waveform can be generated in a short period of time, and by changing a digital pattern, an analog waveform including voltage noises can be readily obtained.

According to another aspect of the present invention, a step response is simulated by using a transmission path model or a circuit model, adjacent ones of the simulated data are subjected to difference operation to generate the filter coefficient representing the nature of the voltage noise, data of an analog waveform is generated by operating the filter coefficient and the divided logic data, and the analog waveform is subjected to skipping operation.

Therefore, according to the present invention, not only the voltage noises such as reflection and rounding but also an output waveform which has passed through a transmission path can be simulated and output.

More preferably, the apparatus of the present invention generates a filter coefficient by exponential function operation, or generates a filter coefficient by dividing a certain waveform into elements based on a point of change of the waveform and by carrying out exponential function operation for each of the elements obtained by the division.

More preferably, a test pattern consisting of a combination of a first and second logic levels is generated, the test pattern is divided by an externally applied filter order, and thus divided logic data is generated.

More preferably, data in accordance with time resolution obtained by dividing period of an externally input data bit by an externally input filter order is simulated by simulation means. The simulated data is normalized, and adjacent data are subjected to different operation and thus filter coefficient representing the nature of the voltage noise is obtained.

Further, a signal of analog waveform is output in accordance with skip data.

More preferably, generation of the filter coefficient, generation of divided logic data, filter operation and skipping of data are performed by means of software.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows states of a memory included in the filter coefficient generator.

FIG. 10 shows states of another memory in operation in the filter coefficient generator.

FIG. 22 shows data arrangement used in the arithmetic unit shown in FIG. 20.

FIG. 23 shows templates of waveforms necessary for the input of S interface LSI in the arbitrary waveform generating apparatus shown in FIG. 21.

DESCRIPTION OF THE PREFERRED EMBODIMENTS

Figure 1:
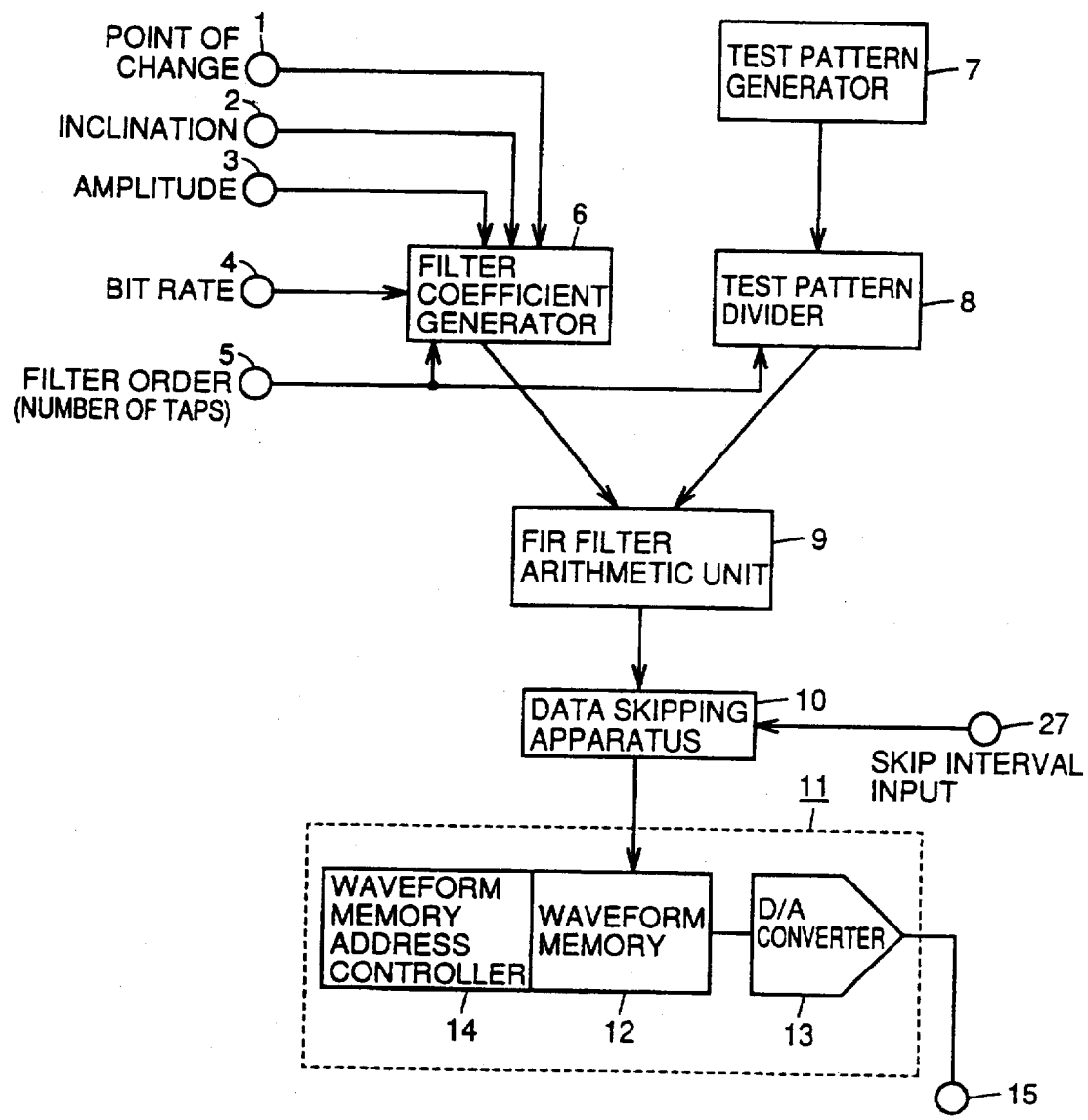
FIG. 1 is a block diagram of an arbitrary waveform generator in accordance with a first embodiment of the present invention.
Figure 2:
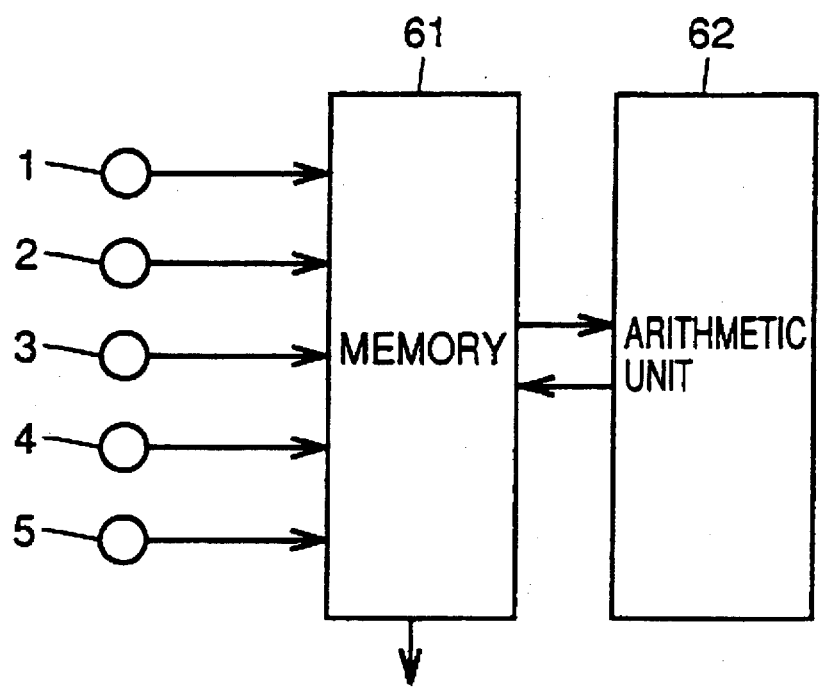
FIG. 2 is a block diagram showing a memory and an arithmetic unit constituting a filter coefficient generator shown in FIG. 1.

FIG. 1 is a block diagram showing a first embodiment of the present invention, and FIG. 2 is a block diagram of a filter coefficient to generator shown in FIG. 1.

A structure of one embodiment of the present invention will be described with reference to FIGS. 1 and 2. To a filter coefficient generator 6, time of a point of change in a waveform is input through an input terminal 1; inclination of the waveform is input through an input terminal 2; an amplitude value is input through an input terminal 3; a bit rate representing period of the data bit is input through an input terminal 4; and a filter order is input through an input terminal 5. Filter coefficient generator 6 carries out arithmetic operation on the values input through input terminals 1 to 5 and generates a filter coefficient. The generated filter coefficient is applied to FIR filter arithmetic unit 9. A test pattern generator 7 generates an arbitrary test pattern consisting of a combination of logic data "0", "1" and "−1", and the generated test pattern is applied to a test pattern divider 8. The filter order has been input to test pattern divider 8 through input terminal 5. Test pattern divider 8 divides data of each test pattern applied from test pattern generator 7 by the filter order $j_{max}$ and applies an output to FIR filter operating unit 9. FIR filter operating unit 9 performs arithmetic operation on the value of data from filter coefficient generator 6 and the value of data from test pattern divider 8, and applies the result of operation to a data skipping apparatus 10. A skipping interval, which is a positive integer, is input through an input terminal 27 to data skipping apparatus 10. Data skipping apparatus 10 skips the data from FIR filter operating unit 9 at every value of the skipping interval. An output from data skipping apparatus 10 is applied to an analog waveform generating apparatus 11. The analog waveform generating apparatus 11 consists of a waveform memory 12, a D/A converter 13 and a waveform memory address control circuit 14, and it is conventionally known.

Figure 3:
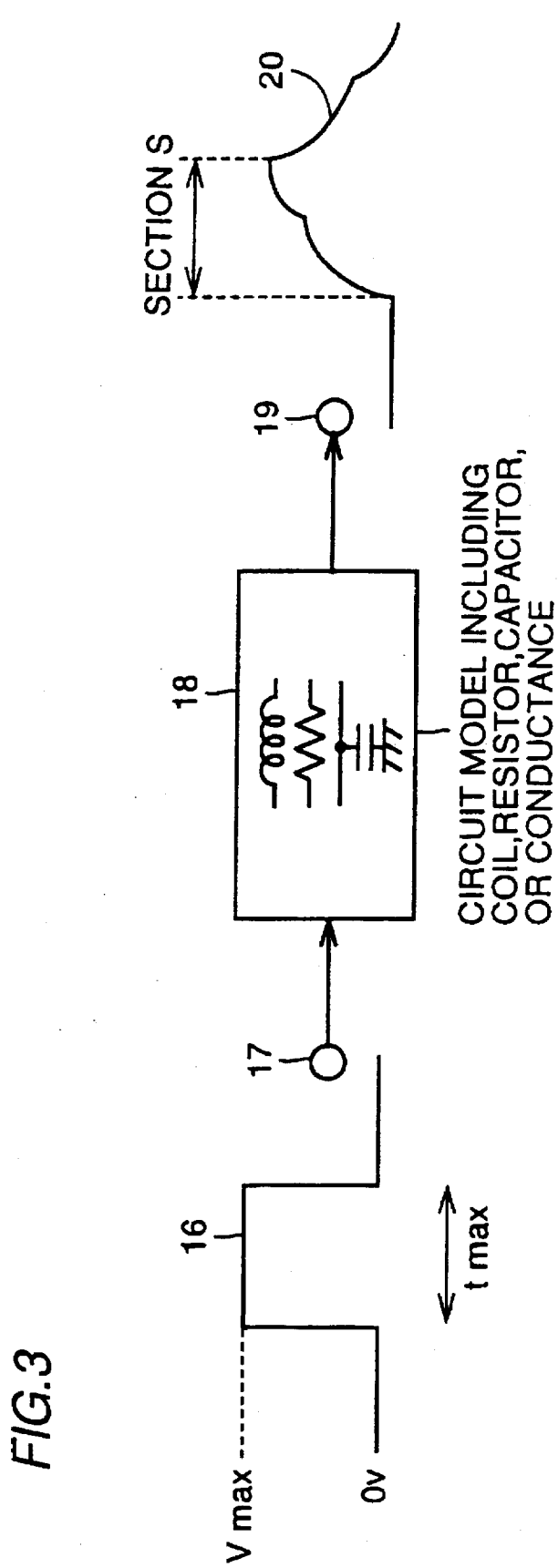
FIG. 3 shows a step response through a circuit model such as a transmission path, an actual transmission line or an LSI circuit.

Filter coefficient generator 6 includes a memory 61 and an arithmetic unit 62 such as DSP (Digital Signal Processor). FIG. 3 illustrates response waveform when an input signal for step response is applied to a circuit model such as a transmission path. Referring to FIG. 3, an input waveform 16 for the step response is input through a step response input terminal 17 to a circuit model 18, and a step response waveform 20 is obtained at a step response output terminal 19. Circuit model 18 may be a transmission circuit including a coil, a resistance and a capacitor, or it may be an actual transmission circuit. according to one embodiment of the present invention, in order to generate a filter coefficient representing nature of reflection, rounding and the like, a template waveform is used, which is an element of the waveform in a section S, obtained by dividing step response waveform 20 corresponding to the change in the input waveform 16 for step response from 0 V to $V_{max}$.

Figure 4:
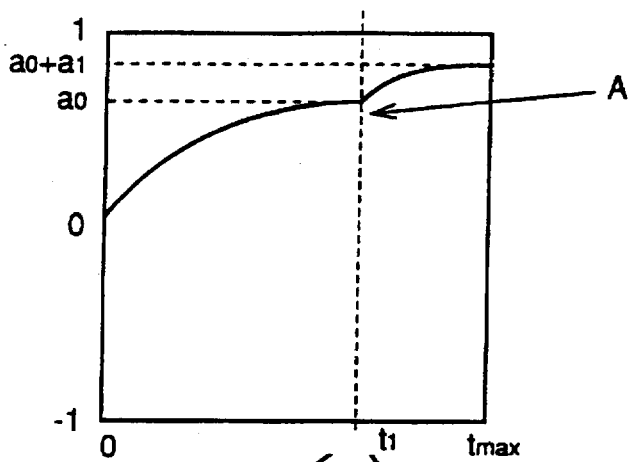
FIG. 4 shows the step response waveform of FIG. 3 and divided waveform obtained by dividing the step response waveform at a point of change.
Figure 4:
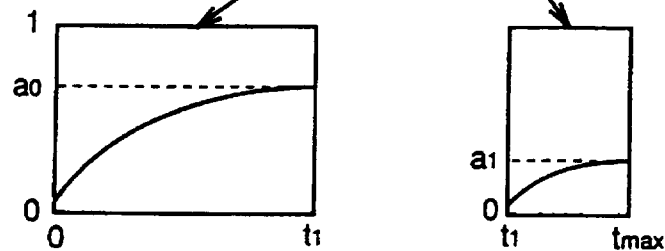

FIG. 4 shows an example of a waveform obtained by normalizing voltages axis of template waveform of section S of the step response waveform 20 shown in FIG. 3 by $V_{max}$, defined, for example, by ITU-T Recommendation. The waveform shown in FIG. 4 includes reflection and rounding. Reflection appears as a point of change in the waveform at point A of FIG. 4(a), while rounding appears as a curve of exponential function. When the waveform of FIG. 4(a) is divided at the point A of change (time $t_1$), curves of (b) and (c) of FIG. 4 are obtained.

Figure 5:
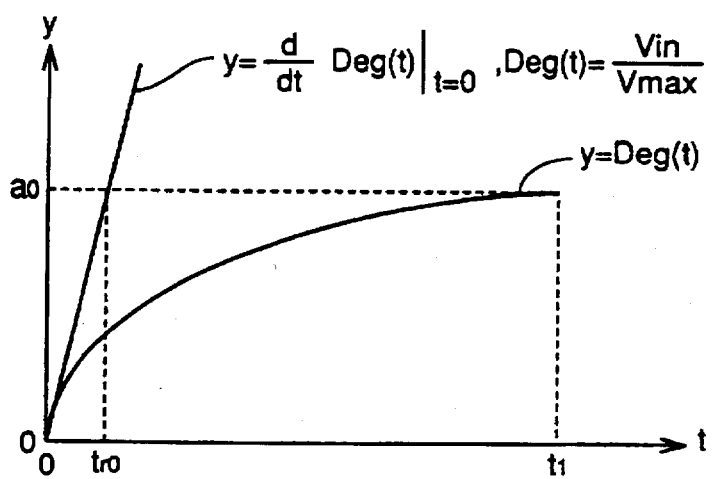
FIG. 5 shows divided waveform of FIG. 4 and a tangent.

FIG. 5 shows the curve shown in FIG. 4(b) and a tangent in contact with the point t=0, in which the ordinate represents the y axis and the abscissa represents time t. The y axis shows the voltages normalized by the maximum voltage $V_{max}$ of an ideal digital waveform. A time on the time axis where the tangent at t=0 and the line $y=a_0$ intersect is represented as $t_{r0}$.

Figure 6:
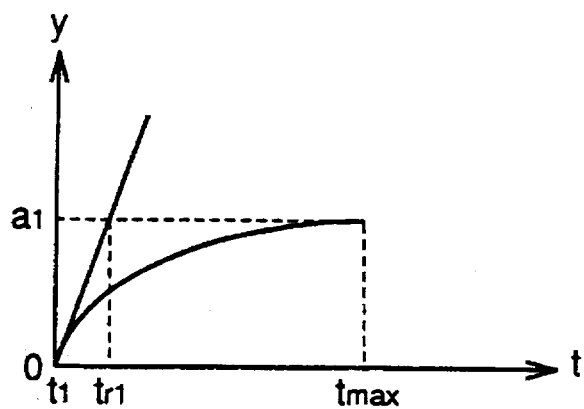
FIG. 6 shows another divided waveform of FIG. 4 and a tangent.

FIG. 6 shows the curve of FIG. 4(c) and a tangent in contact with a point of $t=t_1$, in which the ordinate is a y axis and the abscissa represents time t. The point on the time axis where the tangent at $t=t_1$ intersects $y=a_1$ is represented by $t_{r1}$.

Figure 7:
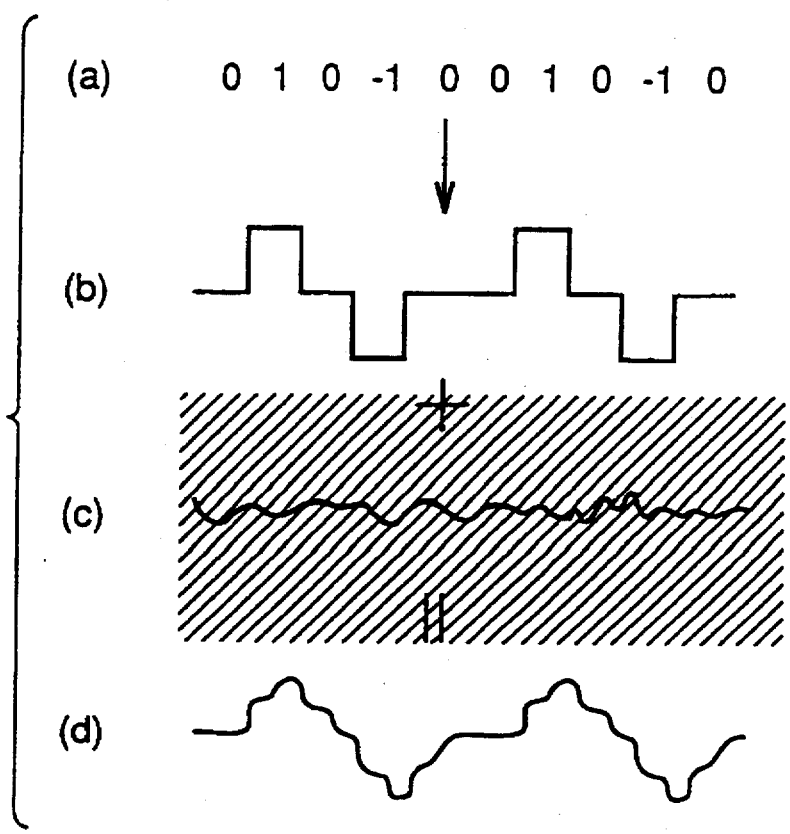
FIG. 7 is a diagram of waveforms illustrating the concept of the present invention.

FIG. 7 is a diagram of waveform showing the concept of the present invention. In FIG. 7, (a) represents logic data output from test pattern generator 7; (b) represents a digital waveform representing the logic data by physical symbols; (c) is a waveform representing nature of voltage noises such as reflection and rounding in terms of filter coefficient and filter order, which is obtained by FIR filtering of the ideal digital waveform, and (d) is an analog waveform including the voltage noises obtained as shown in (c).

Specific operation of one embodiment of the present invention will be described with reference to FIGS. 1 to 7. First, filter order $j_{max}$ is input to input terminal 5 of FIG. 1. Filter order $j_{max}$ is a largest integer satisfying $j_{max} < f_s \times q/f_d$, where $f_s$ represents sampling frequency of analog waveform generating apparatus 11 and $f_d$ ($1/t_{max}$) represents frequency of the data bit. Here, q is a positive integer, which is later used in the data skipping apparatus 10. Further, period $t_{max}$ of the data bit is input to input terminal 4, and the time at the point of change in the waveform shown in FIG. 4(a) is input to input terminal 1. However, if the number of points of change in the waveform in one template is 0, there is not an input. When there is one point of change in the waveform in one template, the time $t_1$ at the point of change A of the waveform shown in FIG. 4(a) is input. When there are a plurality of points of change (M), corresponding times $t_1$ to $t_M$ are input.

Further, $a_0$ shown in FIG. 4(b) and $a_1$ shown in FIG. 4(c) are input to input terminal 3. However, if there is not a point of change in the waveform of one template, only $a_0$ shown in FIG. 4(b) is input. When there is one point of change in the waveform, $a_0$ and $a_1$ shown in FIG. 4(c) are input. When there are a plurality of (M) points of change in the waveform, $a_0$ to $a_M$ are input.

Two input terminal 2, $t_{r0}$ and $t_{r1}$ shown in FIGS. 5 and 6 are input. However, when there is not a point of change in the waveform in one template, only the time $t_{r0}$ shown in FIG. 5 is input. When there is one point of change in the waveform, $t_{r0}$ and $t_{r1}$ shown in FIGS. 5 and 6 are input. When there are a plurality of (M) points of change in the waveform, $t_{r0}$ to $t_{rM}$ are input.

Figure 8:
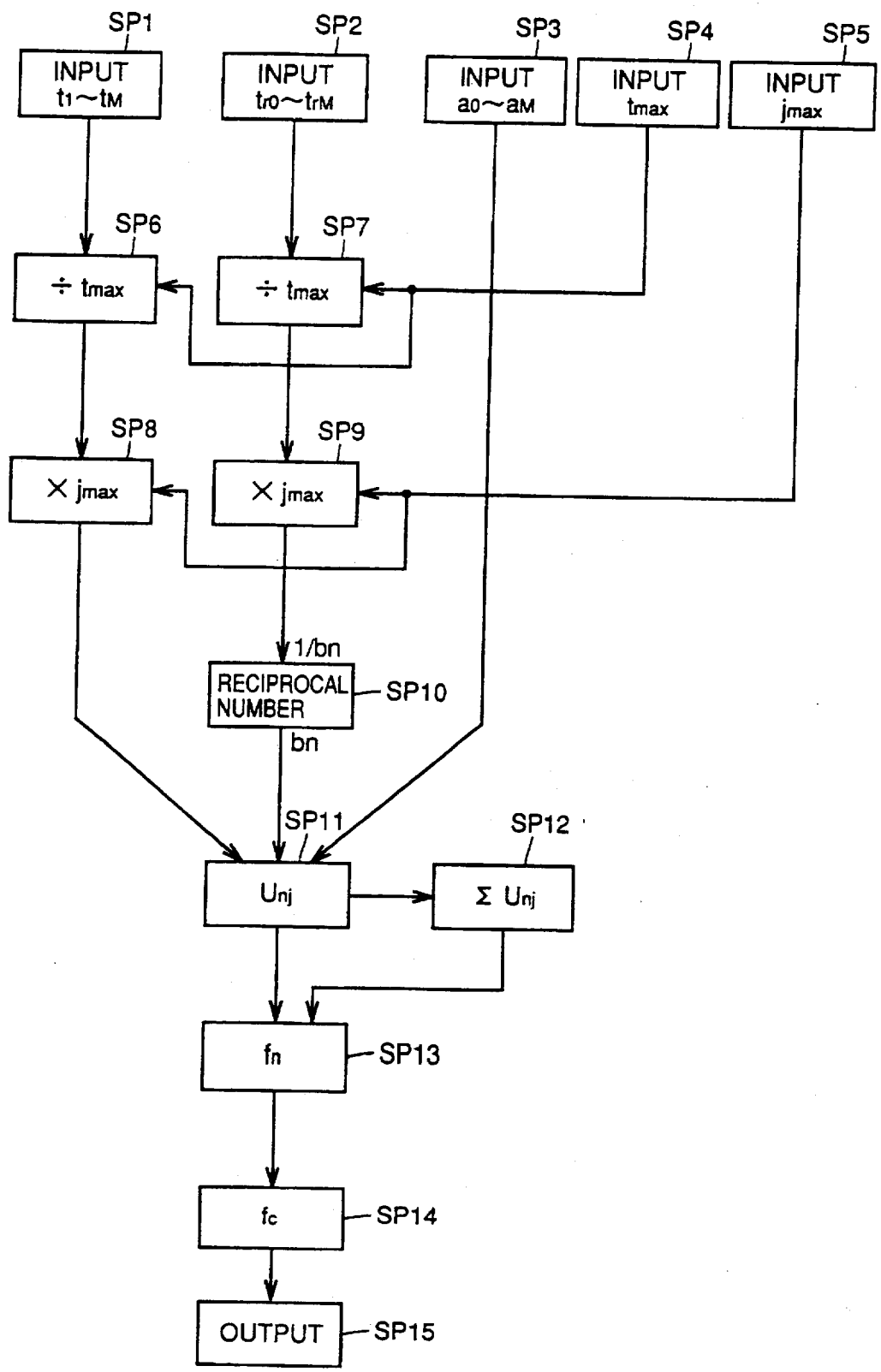
FIG. 8 is a flow chart showing the operation of the filter coefficient generator shown in FIG. 1.

FIG. 8 is a flow chart showing the operation of the filter coefficient generator shown in FIG. 1, and FIG. 9 shows states in the memory when the filter coefficient generator is in operation.

In step (in the figures, simply denoted by SP) SP1 in FIG. 8, values of $t_1$ to $t_M$ (in the example of FIG. 4, value of $t_1$ only) input through input terminal 1 are stored in memory 61. The state of memory 61 at that time is as shown in FIG. 9(1). Here, the reference numeral M represents the number of points of change in the template waveform. In step SP2, values $t_{r0}$ to $t_{rM}$ (in the example of FIG. 4, values of $t_{r0}$ and $t_{r1}$) input through input terminal 2 are stored in memory 61. The state of memory 61 at that time is as shown in FIG. 9(2). In step SP3, the values of $a_0$ to $a_M$ (in the example of FIG. 4, values of $a_0$ and $a_1$) input through input terminal 3 are stored in memory 61. The state of memory 61 at that time is as shown in FIG. 9(3). In step SP4, the value of $t_{max}$ input through input terminal 4 is stored in memory 61. The state of memory 61 at that time is as shown in FIG. 9(4). In step SP5, the value of filter order $j_{max}$ input through input terminal 5 is stored in memory 61, and the state of memory 61 at that time is as shown in FIG. 9(5).

In step SP6, the value $t_n$ (in the example of FIG. 4, only the value of $t_1$) input in step SP1 is normalized by $t_{max}$. More specifically, the following operation is carried out by the arithmetic unit 62:

$$P_n = t_n/t_{max},\ n=1, 2, 3, \ldots, M$$

The result of this operation is stored in memory 61. The state of memory 61 at that time is as shown in FIG. 9(6).

In step SP7, the value $t_{rn}$ (in the example of FIG. 4, values of $t_{r0}$ and $t_{r1}$) input in step SP2 are normalized by $t_{max}$. More specifically, arithmetic unit 62 carries out the following operation:

$$P_{rn} = t_{rn}/t_{max},\ n=0, 1, 2, 3, \ldots, M$$

The results of these operations are stored in memory 61, and the state of memory 61 at that time is as shown in FIG. 9(7).

In step SP8, the value $P_n$ (in the example of FIG. 4, only the value of $p_1$) input in step SP6 is divided by $j_{max}$. More specifically, arithmetic unit 62 carries out the following operation.

$$j_n = P_n \times j_{max},\ n=0, 1, 2, 3, \ldots M$$

where $j_n$ is rounded at a decimal point so as to be a positive integer, and if n=0, $j_0$ is set to be $j_0=1$. The result of operation is stored in memory 61, and the state of memory 61 at that time is as shown in FIG. 9(8). In step SP9, the value $P_{rn}$ (in the example of FIG. 4, values of $P_{r0}$ and $P_{r1}$) calculated in step SP7 is multiplied by $j_{max}$. More specifically, arithmetic unit 62 carries out the following operation.

$$b_{rn} = P_{rn} \times j_{max},\ n=0, 1, 2, 3, \ldots, M$$

The result of operation is stored in memory 61, and the state of memory 61 at that time is as shown in FIG. 9(9).

In step SP10, a reciprocal number of the value $b_{rn}$ (in the example of FIG. 4, values of $b_{r0}$ and $b_{r1}$) calculated in step SP9 is calculated by arithmetic unit 62.

Namely, $$b_n = 1/b_{rn},\ n=0, 1, 2, 3, \ldots, M$$

The result of operation is stored in memory 61, and the state of memory 61 at that time is as shown in FIG. 9(10).

In step SP11, using the results of operations in steps SP3, SP8 and SP10, arithmetic unit 62 performs the following operation.

$$u_{nj} = a_n \times b_n \times \exp(-b_n(j-j_n)),$$

$$j = j_n, j_n+1, j_n+2, j_n+3, \ldots, j_{max}$$

$$n=0, 1, 2, 3, \ldots, M$$

where, if $j=1, 2 \ldots, j_n-1$, then $u_{nj}=0$, and if n=0, then $j_o=1$.

The results of these operations are stored in memory 61, and the state of memory 61 at that time is as shown in FIG. 10(11). In the example of FIG. 4, the values are of $u_{0j}$ and $u_{1j}$.

In step SP12, arithmetic unit 62 carries out the following operation, using the result of operation in step SP11.

$$S_n = \sum_{j=1}^{j_{max}} u_{nj}\quad n=0, 1, 2, 3, \ldots, M$$

The result of this operation is stored in memory 61, and the state of memory 61 at that time is as shown in FIG. 10(12).

In step SP13, arithmetic unit 62 carries out the following operation by using the results of operations of steps SP11 and SP12.

$$f_{nj} = a_n/S_n \times u_{nj}$$

$$n=0, 1, 2, 3, \ldots, M$$

$$j=1, 2, 3, \ldots, j_{max}$$

The result of this operation is stored in memory 61.

In step SP14, arithmetic unit 62 carries out the following operation by using the result of operation of step SP13.

$$f_{cj} = f_{0j} + F_{1j}f_{2j} + \ldots + f_{nj} + \ldots + f_{Mj}$$

$$n=0, 1, 2, 3, \ldots, M$$

$$j=1, 2, 3, \ldots, j_{max}$$

The result of operation, $f_{cj}$, is a filter coefficient representing the nature of reflection, rounding or the like, which is stored in memory 61. In the example of FIG. 4, $f_{cj} = f_{0j} + f_{1j}$. In step SP15, arithmetic unit 62 provides the result of operation $f_{cj}$.

Figure 11:
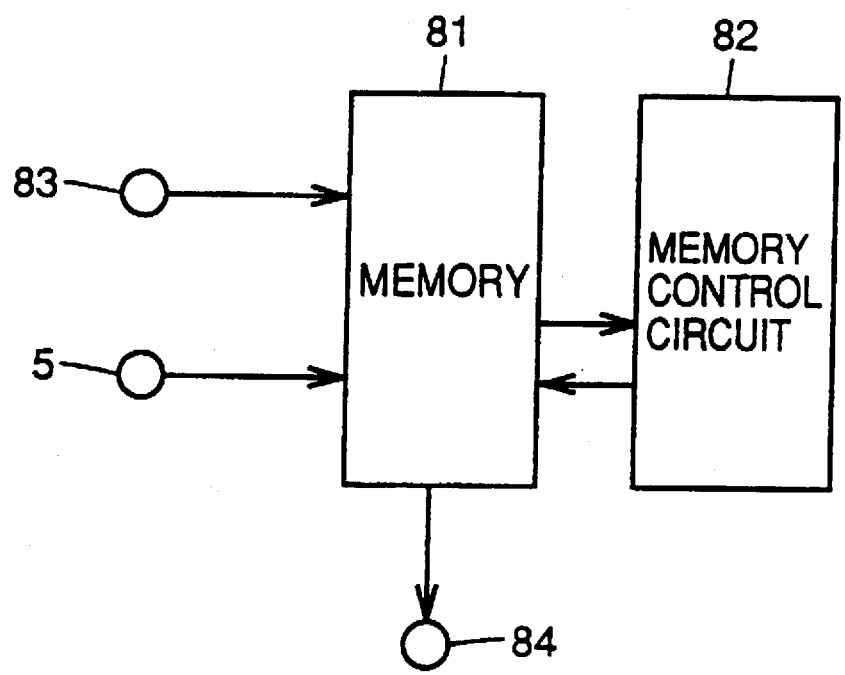
FIG. 11 is a block diagram showing a structure of a test pattern divider shown in FIG. 1.

FIG. 11 is a block diagram showing an example of the test pattern divider shown in FIG. 1. Test pattern divider 8 includes a memory 81 and a memory control circuit 82, a test pattern is applied from test pattern generator 7 to an input terminal 83, the filter order is applied to input terminal 5, and divided logic data is output from memory 81 at output terminal 84.

Figure 12:
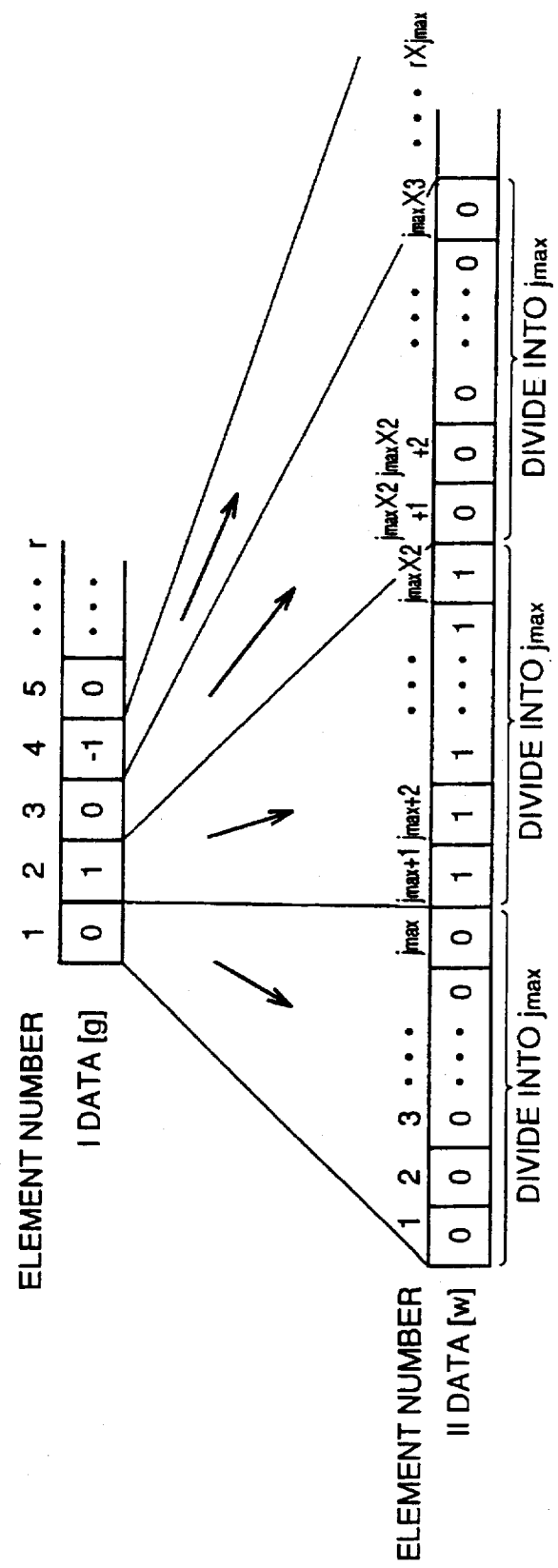
FIG. 12 is an illustration showing the operation of the test pattern divider.

FIG. 12 shows an example of operation for dividing logic data output from test pattern generator 7 by $j_{max} \times r$, by means of test pattern divider 8 shown in FIG. 11. For example, logic data Idata [1]=0 at element number g=1 is divided by filter order $j_{max}$ input through input terminal 5. The divided logic data IIdata [w] would be 0 from w=1 to w=$j_{max}$. Similarly, Idata [2]=1 is divided by filter order $j_{max}$, and the divided logic data IIdata [w] would be 1 from w=$j_{max}$+1 to w=$j_{max}\times$2. Similar operation is continued until the element number g attains r, that is g=r.

In FIR arithmetic unit 9 shown in FIG. 1, the following operation is performed by using filter coefficient $f_{cj}$ from filter coefficient generator 6 and logic data IIdata [w] from test pattern divider 8.

$$Data[i] = \sum_{k=1}^{jmax} (IIdata[i+k-1] \times f_c[j_{max}-k+1])$$

$i = 1, 2, 3, \ldots, (r \times j_{max} - j_{max})$ $f_{cj} = f_c[j], j = 1, 2, 3, \ldots j_{max}$ Data [i] is data of a waveform including reflection and rounding.

In data skipping apparatus 10 shown in FIG. 1, skipping of Data [i] is performed, at every interval corresponding to a positive integer q input through input terminal 27. The skip data is quantized, and loaded in waveform memory 12 of analog waveform generating apparatus 11. Waveform memory address control circuit 14 of analog waveform generating apparatus 11 designates an address of waveform memory 12 based on a clock signal, and thus data is read. The read data is converted to an analog signal by D/A converter 13, and output through an analog waveform output terminal 15.

In this embodiment, the larger the filter order $j_{max}$ and the nearer to 1 the skipping value q, the higher the accuracy of the waveform.

As described above, according to the present embodiment, a filter coefficient representing nature of voltage noises such as reflection and rounding is generated from filter coefficient generator 6, and an analog waveform including voltage noises such as reflection and rounding added to a digital waveform is produced by FIR filtering technique. Therefore, an analog waveform including voltage noises can be generated in a short period of time, and an analog waveform including voltage noises can be readily obtained even when digital pattern is changed.

Figure 13:
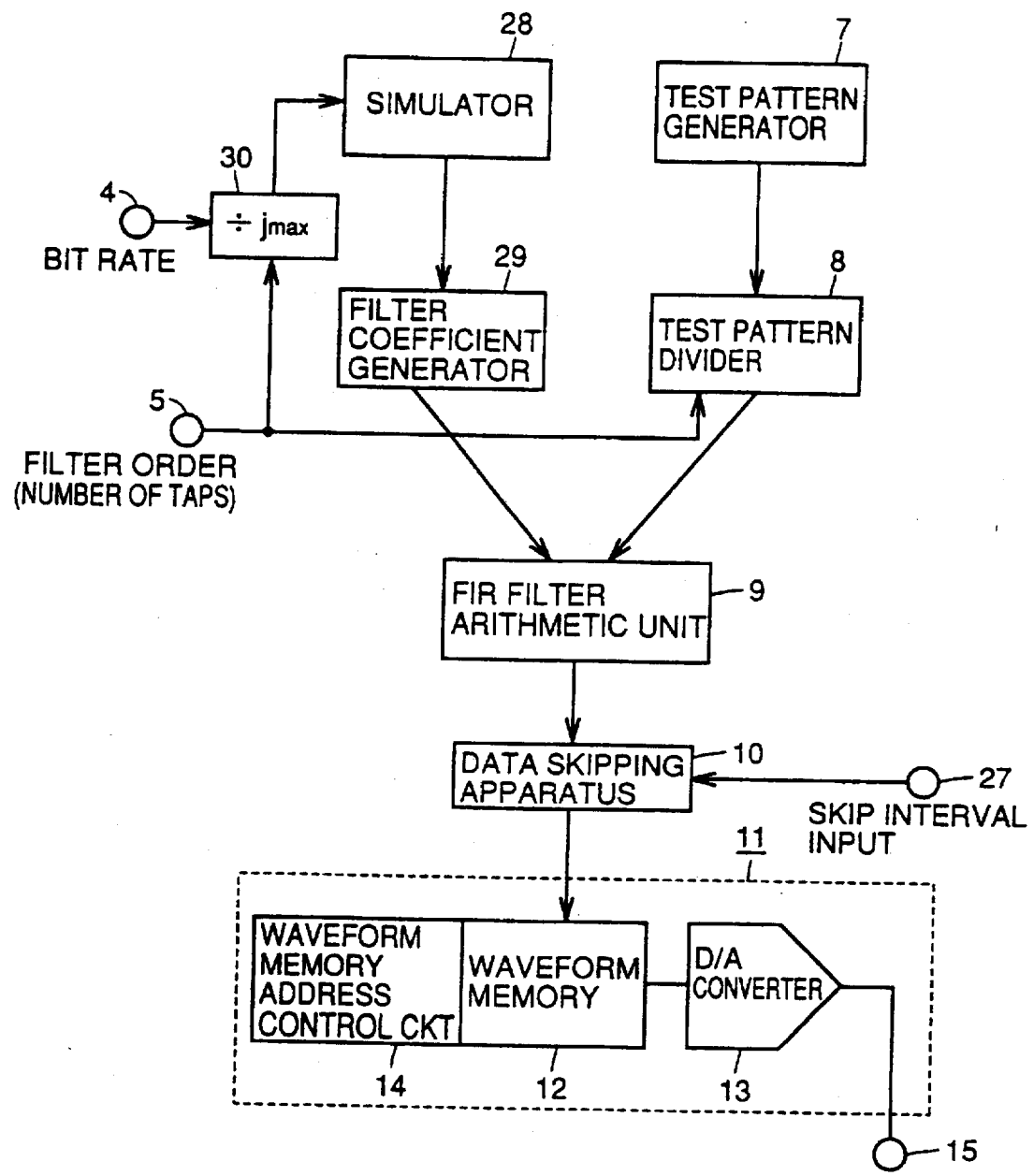
FIG. 13 is a block diagram showing a second embodiment of the present invention.

FIG. 13 is a block diagram showing a second embodiment of the present invention. In the embodiment shown in FIG. 13, step response is simulated by a simulator 28, for generating a filter coefficient. More specifically, period $t_{max}$ of the data bit of the input waveform 16 for step response shown in FIG. 3 is input to input terminal 4, and a filter order is input to input terminal 5. The input bit rate and the filter order are applied to a divider 30, and divider 30 divides the data bit period $t_{max}$ by the value $j_{max}$ of the filter order. The result of division by the divider 30 is applied to simulator 28. Simulator 28 simulates step response by means of software processing in accordance with SPICE, for example. The result of simulation by simulator 28 is applied to filter coefficient generator 29. The filter coefficient generated by filter coefficient generator 29 is applied to FIR filter arithmetic unit 9.

Test pattern generator 7, test pattern divider 8, data skipping apparatus 10 and analog waveform generating apparatus 11 are structured similarly as those of FIG. 1.

Figure 14:
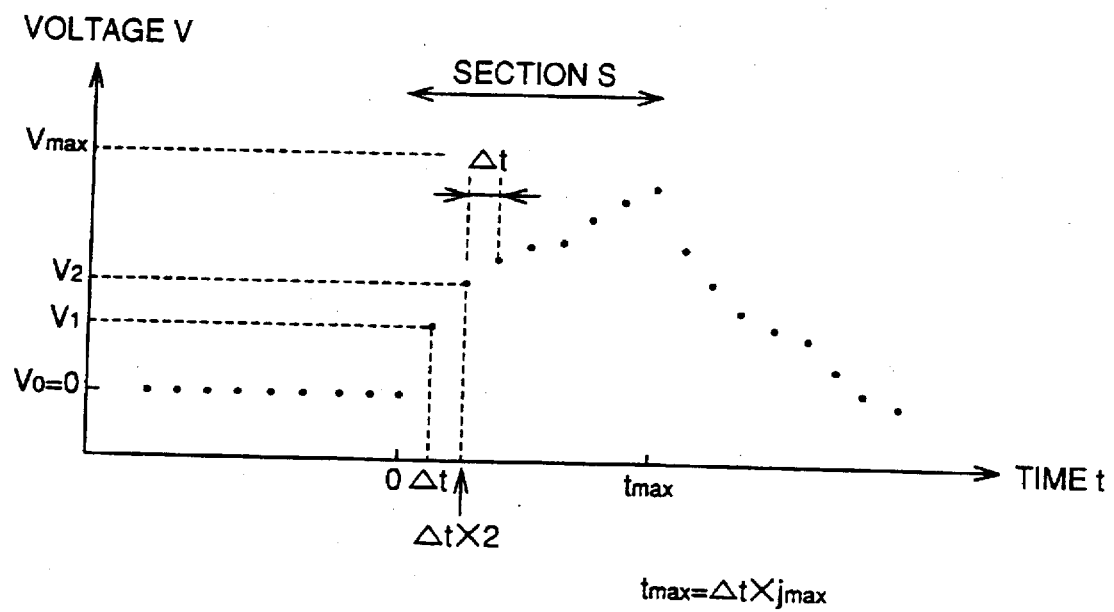
FIG. 14 shows a step response waveform output from a simulator shown in FIG. 13.
Figures 15, 16:
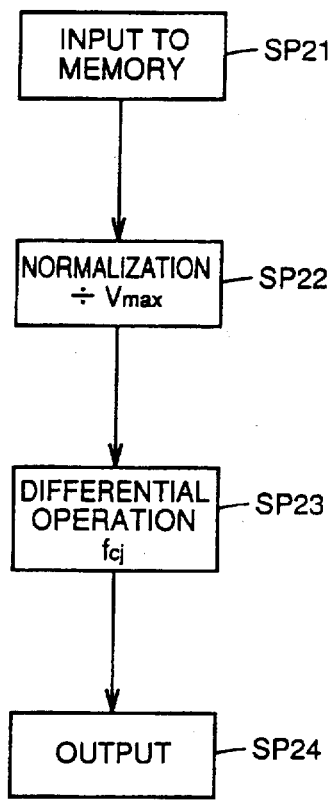
FIG. 15 is a flow chart showing the operation of the filter coefficient generator shown in FIG. 13.
FIG. 16 shows states of a memory when filter coefficient generator shown in FIG. 13 is in operation.

FIG. 14 shows a step response waveform output from simulator 28 of FIG. 13, FIG. 15 is a flow chart showing the operation of filter coefficient generator 29 shown in FIG. 13, and FIG. 16 shows states of the memory included in filter coefficient generator 29.

Referring to FIGS. 13 to 16, the operation of the second embodiment of the present invention will be described. First, filter order $j_{max}$ is input to input terminal 5 of FIG. 13. Filter order $j_{max}$ is a largest positive integer satisfying $j_{max} \leq j_s \times q/f_d$, where $f_s$ represents sampling frequency of analog waveform generating apparatus 11 and $f_d$ (=1/$t_{max}$) represents frequency of the data bit. Here, q is a positive integer, which is used later in the data skipping apparatus 10. Thereafter, period $t_{max}$ of the data bit is input to input terminal 4, the operation of $\Delta t = t_{max}/j_{max}$ is performed by divider 30, and a value $\Delta t$ representing time resolution is input to simulator 28.

Simulator 28 simulates step response in accordance with the scheme shown in FIG. 3. The step response waveform at this time is represented by discrete points at the interval of $\Delta t$ as shown in FIG. 14, and $j_{max}$ data in a section S ($0 \leq t \leq t_{max}$) are transferred to filter coefficient generator 29. In the similar manner as described with reference to FIG. 2, filter coefficient generator 29, which includes memory 61 and arithmetic unit 62, operates in accordance with the flow chart shown in FIG. 15. More specifically, in step SP21 shown in FIG. 15, waveform data shown in FIG. 14 output from simulator 28 is stored in the memory. As for the storage in the memory, the voltage value $V_0$ at time t=0 is written to address 0, the voltage value $V_1$ at time t=$\Delta t$ is written to address 1, the voltage value $V_2$ at time t=$\Delta t \times 2$ is written to address 2, and similarly, writing is continued until the value at time t=$\Delta t \times j_{max}$ is written. The state of the memory 61 at that time is as shown in FIG. 16(1).

In step SP22, the value $V_m$ obtained in step SP21 is normalized by the maximum input voltage $V_{max}$ of the step response. More specifically, arithmetic unit 62 carries out the following operation.

$D_m = V_m/V_{max}, m=0, 1, 2, 3, \ldots, j_{max}$

The result of operation is stored in memory 61. The state of memory 61 at that time is as shown in FIG. 16(2). In step SP23, differential operation of the value $D_m$ normalized in step SP22 is carried out by arithmetic unit 62.

$f_{cj} = f_c[j] = D_j - D_{j-1}, j=1, 2, 3, \ldots, j_{max}$

The result of operation is stored in memory 61. The state of memory 61 at that time is as shown in FIG. 16(3). The value $f_{cj}$ is the filter coefficient representing the nature of reflection and rounding.

As described above, according to the second embodiment of the present invention, as compared with the first embodiment, since step response is simulated by simulator 28, dividing operation at the point of change of the waveform and calculation of exponential function becomes unnecessary and therefore generation of filter coefficient can be simplified.

Figure 17:
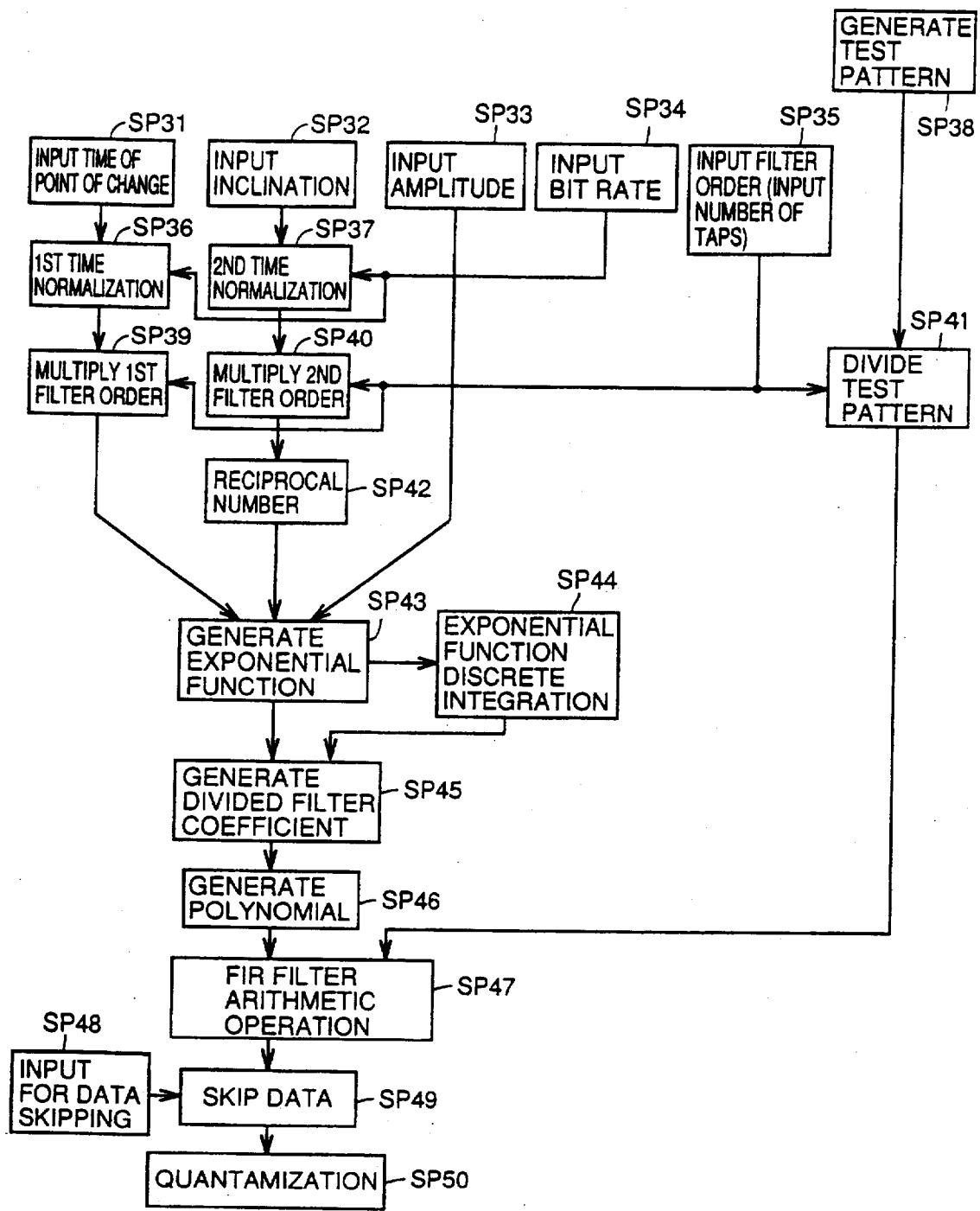
FIG. 17 is a flow chart for generating data of an analog waveform including voltage noises such as reflection and rounding added to a digital waveform, representing a third embodiment of the present invention.

FIG. 17 is a flow chart showing a third embodiment of the present invention. In the first embodiment shown in FIG. 1, data to be input to memory 12 of arbitrary waveform generator 11 is produced by means of a hardware. In the embodiment shown in FIG. 17, the same operation as carried out by the hardware is performed by a software, which is executed by a host computer of a testing apparatus, for example.

More specifically, in step SP35, filter order $j_{max}$ is input to a computer of a tester, for example. Filter order $j_{max}$ is a largest positive integer satisfying $j_{max} < f_s \times q/f_d$ where $f_s$ represents sampling frequency of analog waveform generating apparatus 11 and $f_d$ ($=1/t_{max}$) represents frequency of the data bit, and q is a positive integer used in the later step of data skipping, step SP49. In step SP34, the period $t_{max}$ of the data bit shown at the step response input waveform 16 of FIG. 3 is input, and in step SP31, the time $t_1$ of the point A of change in the waveform shown in FIG. 4(a) is input. However, if there is no point of change in one template, it is not input. When there is one point of change in the waveform, the time $t_1$ of the point A of change shown in FIG. 4(a) is input. When there are of a plurality of (M) points of change, times $t_1$ to $t_M$ are input. In step SP33, $a_0$ and $a_1$ shown in (b) and (c) of FIG. 4 are input. However, if there is not a point of change in the waveform in one template, only $a_0$ shown in FIG. 4(b) is input. When there is one point of change in the waveform, $a_0$ and $a_1$ shown in FIG. 4(c) are input, and where there a plurality of points of change in the waveform (M), $a_0$ to $a_M$ are input.

In step SP32, times $t_{r0}$ and $t_{r1}$ calculated in accordance with FIGS. 5 and 6 are input. However, when there is not a point of change in the waveform in one template, only the time $t_{r0}$ calculated in accordance with FIG. 5 is input. When there is one point of change in the waveform, times $t_{r0}$ and $t_{r1}$ calculated in accordance with FIGS. 5 and 6 are input. When there are a plurality of points of change in the waveform, $t_{r0}$ to $t_M$ are input.

In step SP36, first time normalization takes place. More specifically, the value $t_n$ (n=1, 2, ..., M) input in step SP31 is normalized by the value $t_{max}$ input in step in step SP34. More specifically, the following operation is carried out.

$$P_n = t_n/t_{max}, n = 1, 2, 3, \ldots, M$$

In step SP37, second time normalization takes place. More specifically, the value $t_{rn}$ (n=0, 1, 2, 3, ..., M) input in step SP32 is normalized by $t_{max}$ input in step SP34. More specifically, the following operation is carried out.

$$P_{rn} = t_{rn}/t_{max}, n = 0, 1, 2, 3, \ldots, M$$

In step SP39, a first filter order multiplication is carried out, and in step SP40, a second filter order multiplication is carried out. More specifically, in step SP39, the value $P_n$ (n=0, 1, 2, 3, ..., M) calculated in step SP36 is multiplied by the filter order $j_{max}$ input in step SP35. Namely, the following operation is carried out.

$$j_n = P_n \times j_{max}, n = 0, 1, 2, 3, \ldots, M$$

where $j_n$ is rounded at the decimal point so as to be a positive integer, and if n=0, $j_0$ is set to be $j_0$=1. Meanwhile, in step SP40, the value $P_{rn}$ (n=0, 1, 2, ..., M) calculated in step SP37 is multiplied by the filter order $j_{max}$ input in steps SP35. More specifically, the following operation is carried out.

$$b_{rn} = P_{rn} \times j_{max}, n = 0, 1, 2, 3, \ldots, M$$

In step SP42, reciprocal number of the value $b_{rn}$ (n=0, 1, 2, ..., M) calculated in step SP40 is obtained.

$$b_n = 1/b_{rn}, n = 0, 1, 2, 3, \ldots, M$$

In step SP43, exponential function is generated. More specifically, based on the value $j_n$ (n=0, 1, 2, ..., M) calculated in step SP39, the value $b_n$ (n=0, 1, 2, ..., M) calculated in step SP42, and the amplitude value $a_n$ (n=0, 1, 2, ..., M) input in step SP33, the following operation is carried out.

$$u_{nj} = a_n \times b_n \times \exp(-b_n(j - j_n)),$$

$$j = j_n, j_n+1, j_n+2, j_n+3, \ldots, j_{max}$$

$$n = 1, 2, 3, \ldots, M$$

where j=1, 2, ..., (when $j_n$ is −1, $u_{nj}$=0, and when n=0, $j_0$=1. In the example of FIG. 4, the values $u_{oj}$ and $u_{1j}$).

In step SP44, exponential function discrete integration is performed. More specifically, by using the value $u_{nj}$ (j=$j_n$, ($j_n$+1), ($j_n$+2), ($j_n$+3), ..., $j_{max}$; n=0, 1, 2, 3, ..., M) calculated in step SP43, the following operation is carried out.

$$S_n = \sum_{j=1}^{j_{max}} U_{nj}\, n = 0, 1, 2, 3, \ldots, M$$

In step SP45, by using the value $u_{nj}$ (j=$j_n$, ($j_n$+1), ($j_n$+2), ($j_n$+3), ..., $j_{max}$; n=0, 1, 2, 3, ..., M) and the value $S_n$ (n=0, 1, 2, 3, ..., M) calculated in step SP44, the following operation is carried out.

$$f_{nj} = a_n/S_n \times u_{nj}$$

$$n = 0, 1, 2, 3, \ldots, M$$

$$j = 1, 2, 3, \ldots, j_{max}$$

In step SP46, by using the value $f_{nj}$ (n=0, 1, 2, 3, ..., M); (j=1, 2, 3, ..., $j_{max}$) calculated in step SP45, the following operation is carried out.

$$f_{cj} = f_{0j} + f_{1j} + f_{2j} + \ldots + f_{nj} + \ldots + f_{Mj}$$

$$n = 0, 1, 2, 3, \ldots, M$$

$$j = 1, 2, 3, \ldots, j_{max}$$

the value $f_{cj}$ is the filter coefficient representing the nature of reflection and rounding. In the example of FIG. 4, $f_{cj} = f_{0j} + j_{1j}$.

Meanwhile, in step SP38, the logic data shown in FIG. 7(a) is generated, and in step SP41, the logic data generated in step SP38 is divided by $j_{max} \times r$, where r represents the number of logic data serving as the test pattern. This operation is similar to that described with reference to FIG.

In step SP47, FIR filtering is carried out. More specifically, by using the filter coefficient $f_{cj}$ calculated in step SP46 and logic data IIdata [w] calculated in step SP41, the following operation is carried out.

$$\text{Data}[i] = \sum_{k=1}^{j_{max}} (\text{IIdata}[i + k - 1] \times f_c[j_{max} - k + 1]$$

$$i = 1, 2, 3, \ldots, (r \times j_{max} - j_{max})$$

$$f_{cj} = f_c[j], j = 1, 2, 3, \ldots, j_{max}$$

Data [i] thus obtained is the data of a waveform including reflection and rounding.

In steps SP48, the data skipping value is input. More specifically, the positive integer q referred to in the definition of filter order $j_{max}$ is input. In step SP49, the value Data [i] calculated in step SP47 is skipped at every interval defined by the positive integer q input in step SP48. In step SP50, the value of the skip data is quantized (represented by binary notation), and loaded into waveform memory 12 of analog waveform generating apparatus 11 of FIG. 1.

Figure 18:
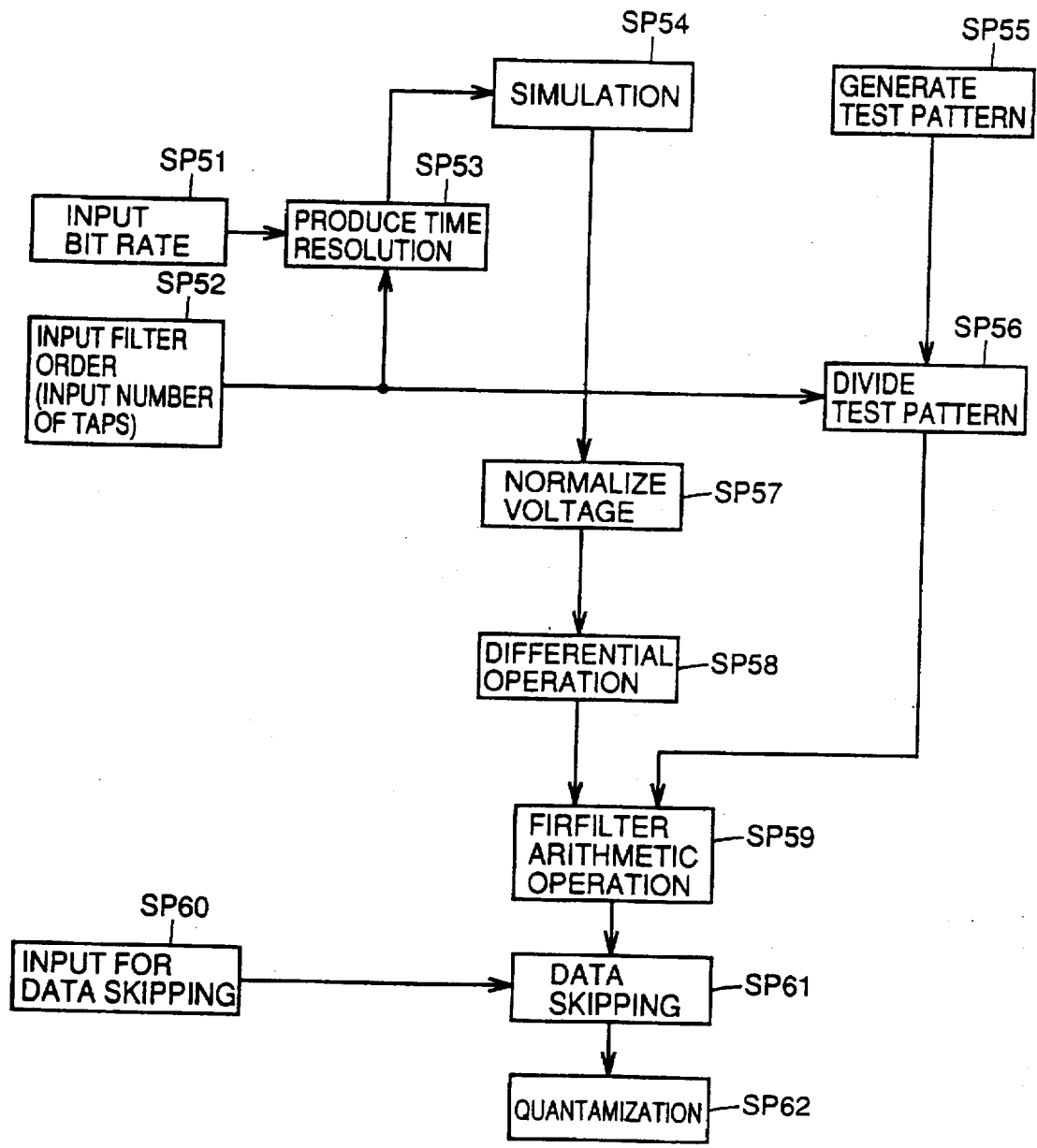
FIG. 18 is a flow chart showing the operation of a fourth embodiment of the present invention.
Figure 19:
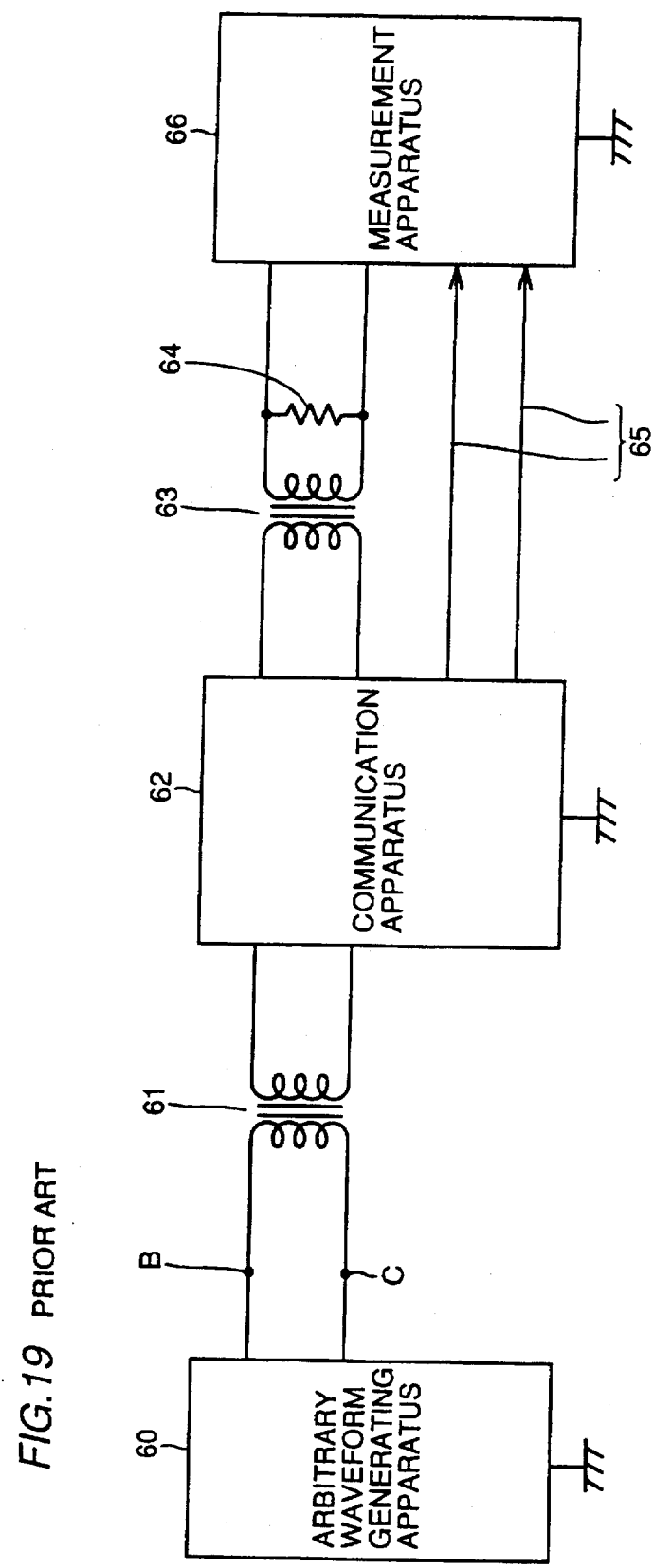
FIG. 19 shows a structure for testing a communication apparatus including semiconductor devices, in accordance with ITU-T Recommendation I.430.
Figure 20A:
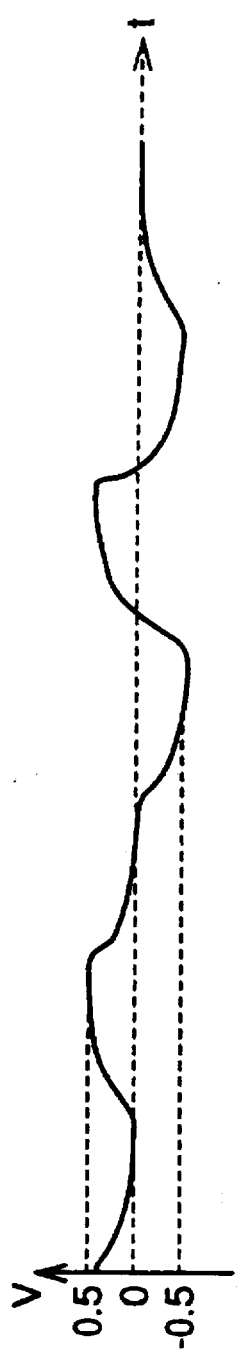
FIG. 20 shows an example of an analog waveform including noises such as reflection and rounding, in accordance with the ITU-T Recommendation I.430.
Figure 20B:
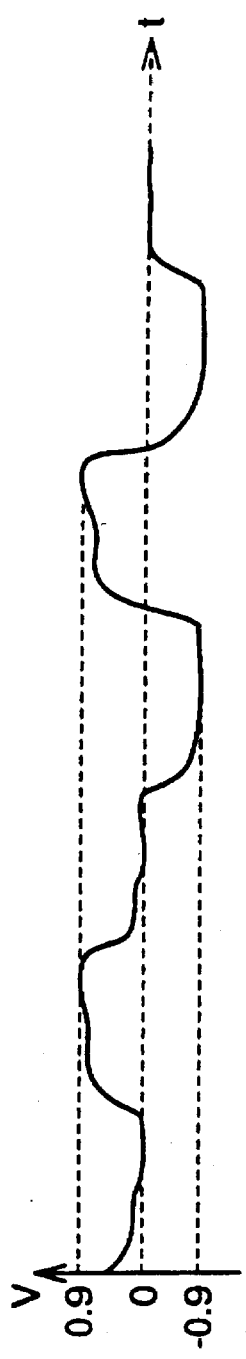
Figure 20C:
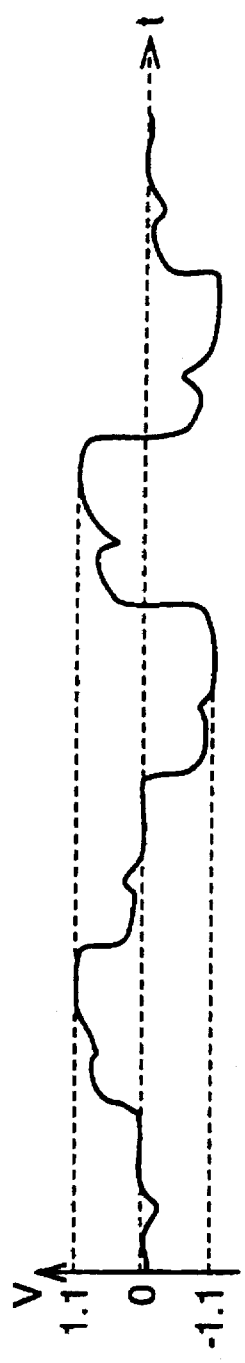
Figure 20D:
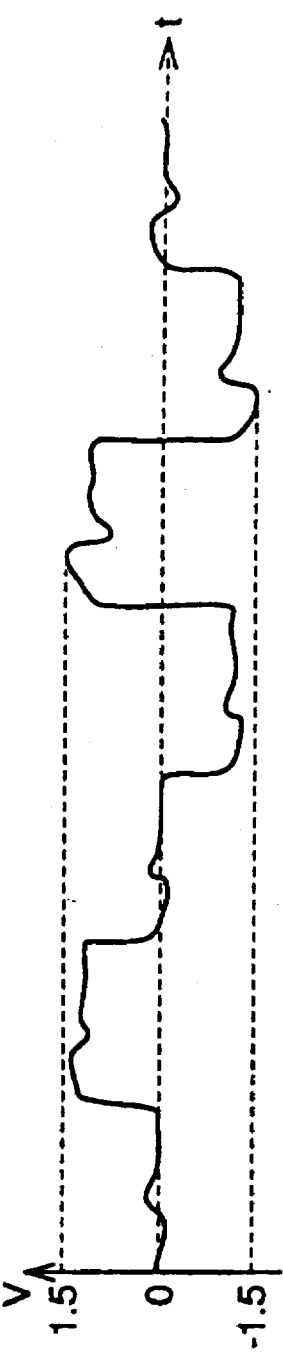
Figure 21:
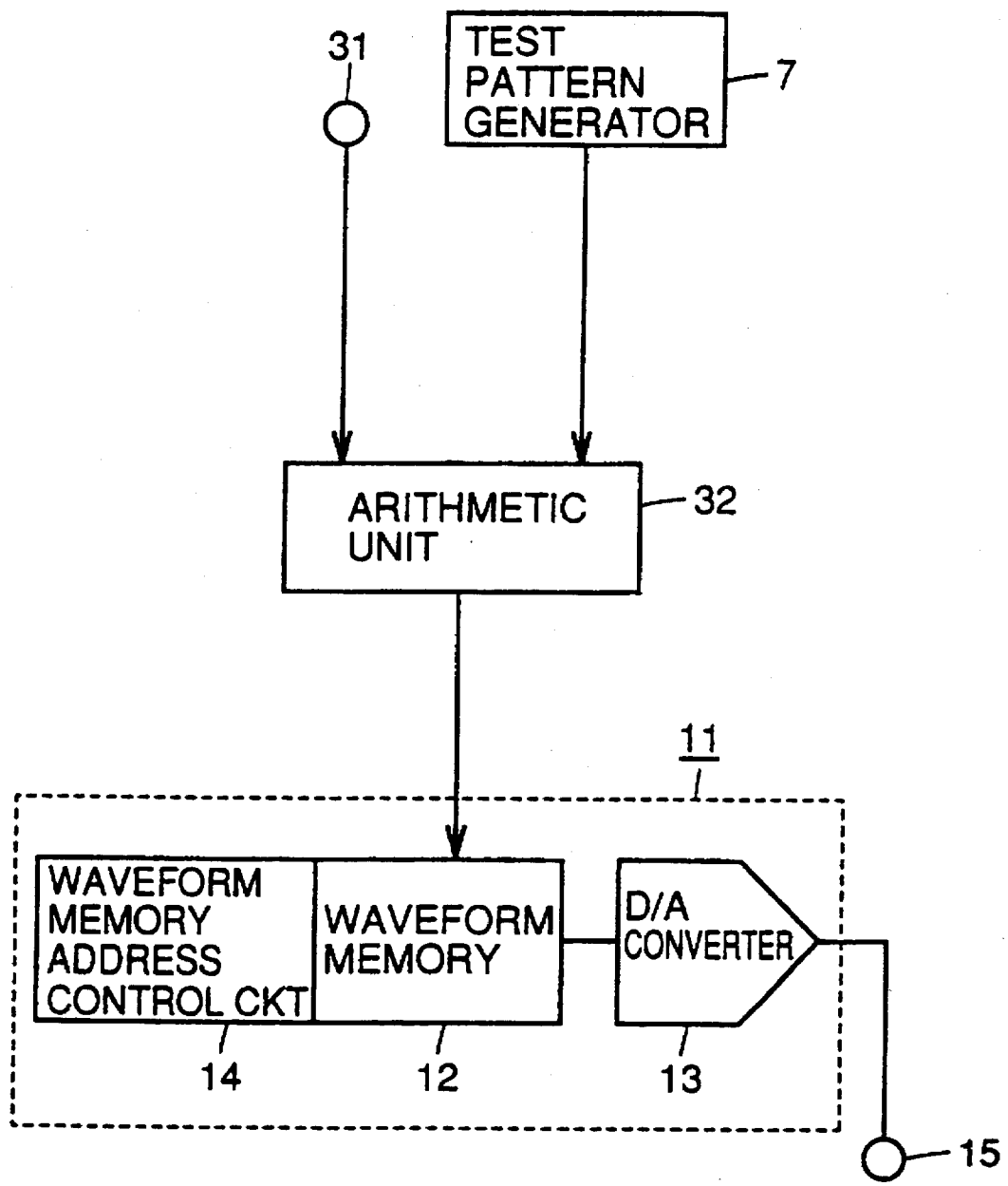
FIG. 21 is a schematic block diagram showing a structure of a conventional arbitrary waveform generating apparatus.
Figure 24:
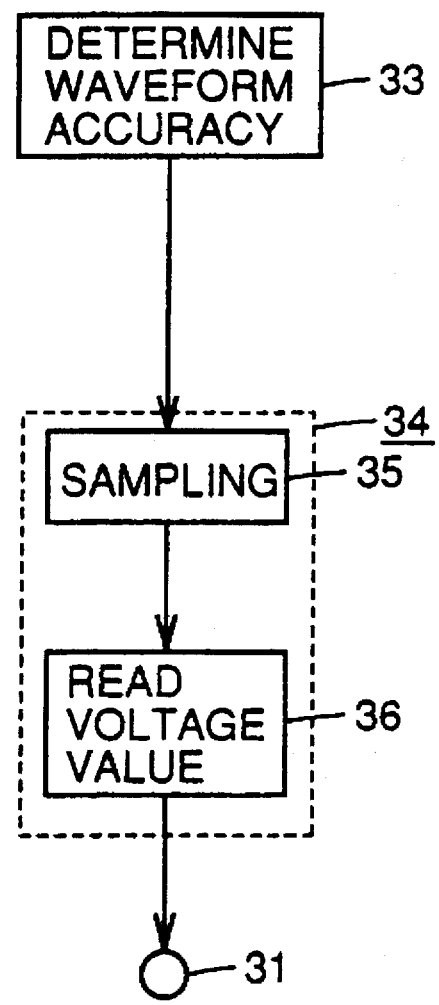
FIG. 24 is a flow chart showing the operation for generating, in non-automatic manner, the data of list of voltages to be input to a terminal shown in FIG. 21.
Figure 25:
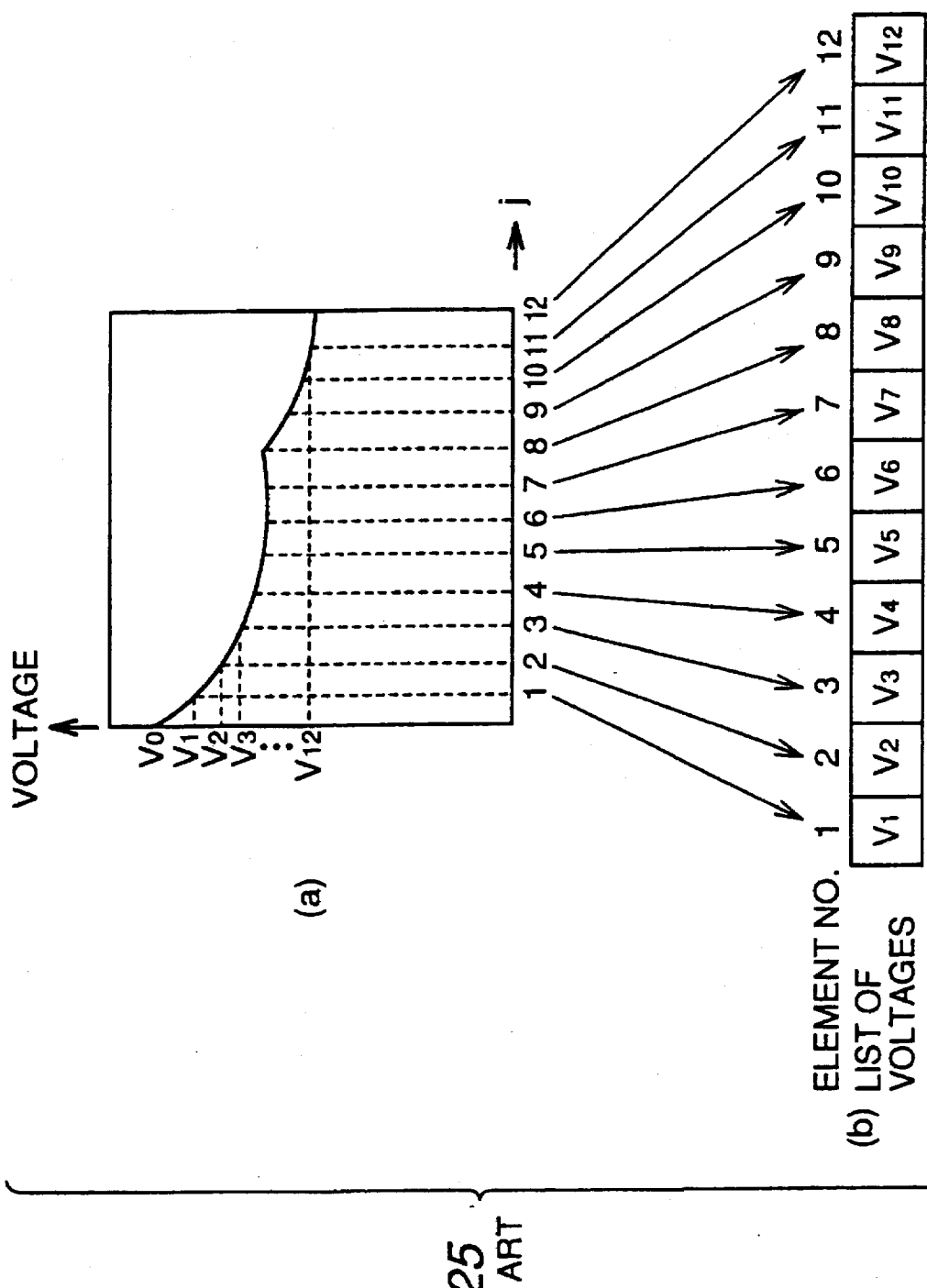
FIG. 25 is an illustration showing the operation for generating list of voltages in accordance with the flow chart of FIG. 24.

FIG. 18 is a flow chart showing a fourth embodiment of the present invention. This embodiment corresponds to the second embodiment shown in FIG. 13. While data is produced by means of a hardware in the second embodiment, the same operation is performed by means of a software in this embodiment. Similar to the third embodiment, this embodiment is also carried out by a host computer of a test apparatus, for example. In steps SP51 and SP52, the bit rate and the filter order are input to a computer of a test apparatus, respectively. Filter order $j_{max}$ is a largest positive integer satisfying $j_{max} < f_s \times q/f_d$ where $f_s$ represents sampling frequency of analog waveform generating apparatus 11 of FIG. 3 and $f_d$ (=$1/t_{max}$) represents frequency of the data bit, and q is a positive integer which will be used in subsequent data skipping operation. As for the bit rate, the period $t_{max}$ of the data bit shown at the step response input waveform 16 of FIG. 3 is input. In step SP53, in order to determine time resolution $\Delta t$ for simulation in step SP54, the following operation is carried out, using filter order $j_{max}$ and data bit period $t_{max}$.

$$\Delta t = t_{max}/j_{max}$$

In step SP54, the step response is simulated by the structure shown in FIG. 3. At this time, the step response waveform is represented by discrete points at the interval of $\Delta t$ as shown in FIG. 14, and $j_{max}$ data in the section S ($0 \leq t \leq t_{max}$) are transferred to a computer of a tester, for example.

In step SP57, the value $V_m$ of the waveform data shown in FIG. 14 which has been simulated and transferred is normalized by the maximum input voltage $V_{max}$ of the step response. More specifically, the following operation is carried out.

$$D_m = V_m/V_{max}, m=0, 1, 2, 3, \ldots, j_{max}$$

In step SP58, difference operation of the value $D_m$ normalized in step SP57 is carried out in accordance with the following equation.

$$f_{cj} = f_c [j] = D_j - D_{j-1}, j=1, 2, 3, \ldots, j_{max}$$

The value $f_{cj}$ is the filter coefficient representing the nature of the voltage noises such as reflection and rounding.

Meanwhile, the logic data generated in step SP55 is divided by $j_{max} \times r$ in step SP56. Here, r represents the number of logic data serving as the test pattern, as shown in FIG. 12. Thereafter, steps SP59 to SP62 are carried out, which correspond to steps SP47 to SP50 of FIG. 17.

As described above, according to the present embodiment, since simulation is carried out, dividing operation at the point of change of the waveform and calculation of exponential function become unnecessary, and therefore generation of filter coefficient is simplified.

As described above, according to the embodiments of the present invention, a filter coefficient representing nature of voltage noises such as reflection and rounding is generated, and an analog waveform including voltage noises such as reflection and rounding added to a digital waveform is generated by using filtering technique, so that analog waveform including voltage noises can be generated in a short period of time, and therefore even when the digital pattern is changed, an analog waveform including voltage noises can be readily obtained.

Further, by simulation means, a waveform obtained by simulating step response using a model of a transmission path or a circuit model can be easily generated, and in that case, parameters to be input can be reduced as compared with the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A waveform data generating apparatus for generating data of an analog waveform, comprising:

filter coefficient generating means using elements obtained by dividing a step response waveform when the step response waveform changes from a first logic level to a second logic level, for generating a filter coefficient representing nature of a voltage noise and rounding in terms of a polynomial of exponential function;

divided logic data generating means for generating divided logic data obtained by dividing various logic data for testing by a filter order, the filter order means the number of taps;

filter arithmetic operation means for operating the filter coefficient output from said filter coefficient generating means and the divided logic data generated from said divided logic data generating means for producing data of the analog waveform; and data skipping means for skipping data of the analog waveform produced by said filter arithmetic operation means.

2. The waveform data generating apparatus according to claim 1, wherein said filter coefficient generating means carries out exponential function operation.

3. The waveform data generating apparatus according to claim 2, wherein a waveform is divided into elements at a point of change, and said filter coefficient generating means performs exponential function operation on each of the elements obtained by the division.

4. The waveform data generating apparatus according to claim 1, wherein said divided logic data generating means includes test pattern generating means for generating a test pattern consisting of a combination of said first and second logic levels, and test pattern dividing means responsive to an externally applied filter order for dividing a test pattern generated from said test pattern generating means.

5. The waveform data generating apparatus according to claim 1, further comprising analog waveform signal output means for outputting a signal of an analog waveform in response to data skipped by said data skipping means.

6. The waveform data generating means according to claim 1, comprising means for executing operations of said filter coefficient generating means, said divided logic data generating means, said filter arithmetic operation means and said data skipping means, by a software.

7. The waveform data generating means according to claim 1, the voltage noise includes reflection and rounding.

8. A waveform data generating apparatus for generating data of an analog waveform, comprising:

simulation means for outputting data obtained by simulating step response using a model of a transmission path or a circuit model;

filter coefficient generating means for performing difference operation of adjacent data output from said simulation means, for generating a filter coefficient representing nature of a voltage noise;

divided logic data generating means for generating divided logic data obtained by dividing various logic data for testing by a filter order;

filter arithmetic operation means for operating the filter coefficient output from said filter coefficient generating means and the divided logic data generated from said divided logic data generating means for producing data of the analog waveform; and data skipping means for skipping data of the analog waveform produced by said filter arithmetic operation means.

9. The waveform data generating apparatus according to claim 8, further comprising dividing means for dividing period of an externally input data bit by an externally input filter order for applying data of time resolution to said simulation means, and said simulation means performs simulation based on said data of time resolution.

10. The waveform data generating apparatus according to claim 9, wherein said filter coefficient generating means normalizes data applied from said simulation means, performs difference operation, and generates a filter coefficient representing nature of a voltage noise.

11. The waveform data generating means according to claim 2, the voltage noise includes reflection and rounding.

* * * * *